(12) United States Patent
Hirata et al.

(10) Patent No.: US 8,982,494 B2
(45) Date of Patent: Mar. 17, 2015

(54) HEAD GIMBAL ASSEMBLY AND DATA RECORDING AND REPRODUCING APPARATUS HAVING THE SAME

(75) Inventors: Masakazu Hirata, Symbiosis (SG); Manabu Oumi, Chiba (JP); Majung Park, Chiba (JP); Sachiko Tanabe, Chiba (JP)

(73) Assignee: Seiko Instruments Inc. (JP)

( * ) Notice: Subject to any disclaimer, the term of this patent is extended or adjusted under 35 U.S.C. 154(b) by 309 days.

(21) Appl. No.: 12/737,501

(22) PCT Filed: Jul. 10, 2009

(86) PCT No.: PCT/JP2009/062609
§ 371 (c)(1),
(2), (4) Date: Apr. 12, 2011

(87) PCT Pub. No.: WO2010/010823
PCT Pub. Date: Jan. 28, 2010

(65) Prior Publication Data
US 2011/0188356 A1    Aug. 4, 2011

(30) Foreign Application Priority Data

Jul. 23, 2008   (JP) ................................. 2008-189692
Jan. 26, 2009   (JP) ................................. 2009-014487

(51) Int. Cl.
*G11B 13/08* (2006.01)
*G11B 5/02* (2006.01)
(Continued)

(52) U.S. Cl.
CPC ................ *G11B 5/314* (2013.01); *G11B 13/08* (2013.01); *G11B 5/4853* (2013.01); *G11B 5/4866* (2013.01); *G11B 2005/0005* (2013.01); *G11B 2005/0021* (2013.01)

USPC .... 360/59; 360/234.6; 360/246.2; 369/13.24; 369/13.34

(58) Field of Classification Search
CPC .... G11B 5/314; G11B 5/4853; G11B 5/4866; G11B 2005/0021; G11B 2005/0005; G11B 13/08; G11B 5/02
USPC ..................... 369/13.02, 13.05, 13.24, 13.34; 360/114.02, 123.36, 13.02, 13.24, 360/13.34, 13.05, 59, 234.6, 246.2
See application file for complete search history.

(56) References Cited

U.S. PATENT DOCUMENTS 6,631,227 B2    10/2003   Kasama et al. ................. 385/36
7,966,630 B2 *   6/2011   Hirata et al. .................. 720/659
(Continued)

FOREIGN PATENT DOCUMENTS

JP         2006323908         11/2006
JP         2007042190          2/2007

*Primary Examiner* — Thomas Alunkal
(74) *Attorney, Agent, or Firm* — Adams & Wilks

(57) ABSTRACT

A head gimbal assembly has a suspension configured to extend along a surface of a recording medium and to bend and deform in a thickness direction of the recording medium. A slider is provided on a front end side of the suspension so as to confront the surface of the recording medium. A support section supports the slider such that the slider can pivot about two axes parallel to the surface of the recording medium and perpendicular to each other. An optical waveguide is connected to the slider and is configured to introduce a light flux into the slider. A near-field light generating element generates near-field light from the optical flux and causes the near-field light to record information on the recording medium. A positioning section is mounted between the support section and the slider for positioning the optical waveguide relative to the slider.

22 Claims, 21 Drawing Sheets

(51) Int. Cl.
*G11B 5/31* (2006.01)
*G11B 5/48* (2006.01)
*G11B 5/00* (2006.01)

(56) References Cited

U.S. PATENT DOCUMENTS

2006/0143635 A1* 6/2006 Liu et al. .................. 720/659
2007/0230323 A1* 10/2007 Nishida et al. ............. 369/275.4
2007/0286031 A1* 12/2007 Matsumoto ................. 369/13.13
2008/0049563 A1 2/2008 Konno et al. ............... 369/13.24
2008/0056073 A1* 3/2008 Shimizu ..................... 369/13.02
2008/0204916 A1* 8/2008 Matsumoto et al. ............ 360/59
2008/0316872 A1* 12/2008 Shimizu et al. ............. 369/13.24
2009/0185459 A1* 7/2009 Matsumoto ................. 369/13.02
2010/0074063 A1* 3/2010 Peng et al. .................. 369/13.32

* cited by examiner

HEAD GIMBAL ASSEMBLY AND DATA RECORDING AND REPRODUCING APPARATUS HAVING THE SAME

CROSS-REFERENCE TO RELATED APPLICATIONS

This application is a U.S. national stage application of International Application No. PCT/JP2009/062609 filed Jul. 10, 2009, claiming an earliest priority date of Jul. 23, 2008, and published in a non-English language.

BACKGROUND OF THE INVENTION

1. Technical Field

The present invention relates to a head gimbal assembly configured to record and reproduce various data with respect to a recording medium using a spotlight formed by focusing light and a data recording and reproducing apparatus having the same.

The present application declares a priority on the basis of Patent Application No. 2008-189692 filed in Jul. 23, 2008 in Japan and Patent Application No. 2009-014487 filed in Jan. 26, 2009 in Japan, which are hereby incorporated by reference herein in their entirety.

2. Background Art

In recent years, in response to the needs of recording and reproduction of a larger amount of data at higher density, recording media such as a hard disk or the like (hereinafter, referred to as disk) in computer equipment are required to be further increased in density. Therefore, in order to minimize the influences between adjacent magnetic domains or heat fluctuations, a disk having a higher coercive force comes now into employment. Therefore, recording the data in the disk is becoming difficult.

Therefore, in order to solve such inconvenience as described above, a data recording and reproducing apparatus on the basis of a hybrid magnetic recording system in which the magnetic domain is locally heated using a spotlight formed by focusing light or a near field light formed by focusing light to lower the coercive force temporarily to allow writing into a disk during this period is proposed. In particular, when the near field light is utilized, handling of optical data in an area having a wavelength smaller than the light wavelength, which has been considered to be a limit in the optical system in the related art, is enabled. Therefore, high-density of a recording bit exceeding the optical data recording and reproducing apparatus or the like in the related art is achieved.

There are proposed various types of the data recording and reproducing apparatuses on the basis of the hybrid magnetic recording system described above. As one of those, a data recording and reproducing apparatus which is capable of generating a sufficiently large near field light from a minute opening by supplying light for generating the near field light to a near field optical head and achieving ultrahigh resolution reproduction and recording, high speed recording and reproduction, and higher SN ratio is known. This data recording and reproducing apparatus causes a slider provided with the near field optical head to scan on a disk and arranges the slider at a desired position on the disk. Subsequently, the near field light emitted from a light source and a recording magnetic field generated from the slider are brought into cooperation, so that recording of data on the disk is achieved.

Here, as a known configuration to supply an optical flux to the near field optical head, there is, for example, a configuration in which a light waveguide such as an optical fiber is connected to a proximal side of the slider and an optical flux emitted from a light source is guided to a near field optical head via the light waveguide as shown in Patent Document 1.

PRIOR PUBLICATION

Patent Document

Patent Document 1: JP-A-2001-297463
Patent Document 2: JP-A-2006-323908

Incidentally, in the data recording and reproducing apparatus described above, a configuration in which the near field optical head is arranged on the side of the distal end surface (outflow end) of the slider in order to bring a disk surface and the near field optical head closer to each other is known. However, in this case, there is such problem that it is difficult to introduce the light waveguide to the side of the distal end surface of the slider after having connected the light waveguide to the side of the proximal surface (inflow end) of the slider. In other words, since it is necessary to apply a complicated process on the slider from the proximal side to the distal side, or to arrange a light guide member in order to introduce the light waveguide, the number of process steps and the cost of manufacturing are increased, so that there arises a problem of a low efficiency of manufacturing.

In this manner, in a case where the optical flux is introduced into the near field optical head using the light waveguide, how the light waveguide is introduced to the near field optical head is a concern.

Therefore, as shown in Patent Document 2 for example, a technology in which the slider is made up of a near field optical element substrate having the near field optical head and a mirror substrate having a mirror surface is known. In this case, it is considered that the light waveguide can be introduced to the near field optical head without applying a process on the near field optical element substrate by forming a groove or the like which introduce the light waveguide to the near field optical head or the like on the mirror substrate.

However, since the mirror substrate is used in addition to the near field optical element substrate, the cost of manufacturing is increased. In addition, the plate thickness of the slider is increased because two substrates are used. Therefore, there is a problem of upsizing of the slider.

In view of such circumstances, it is an object of the present invention to provide a head gimbal assembly which is capable of facilitating the arrangement of a light waveguide to a spotlight generating element in a slider, thereby reducing the cost of processing and the cost of manufacturing and hence improving the efficiency of manufacturing, and to provide a data recording and reproducing apparatus having the same.

SUMMARY OF THE INVENTION

In order to achieve the object described above, the present invention provides following means.

A head gimbal assembly according to the present invention is a head gimbal assembly comprising: a suspension extending along a surface of a recording medium and being flexibly deformable in the thickness direction; a slider arranged on a distal side of the suspension so as to oppose the surface of the recording medium; a supporting portion configured to support the slider in parallel to the surface of the recording medium and in a rotatable state with respect to two axes being orthogonal to each other; and a light waveguide connected to the slider and configured to introduce an optical flux emitted from a light source to the slider, wherein the slider includes a spotlight generating element configured to generate a spotlight from the optical flux, and data is recorded in the recording medium using the spotlight, and is characterized in that a positioning portion having a flat surface and being used for positioning the light waveguide and the slider is arranged between the supporting portion and the slider.

According to the head gimbal assembly in the present invention, the light waveguide can be fixed to the slider only by fixing the positioning portion to the slider in a state in which the flat surface and the slider are positioned. Therefore, the positioning or the fixation of the light waveguide and the slider is facilitated.

The head gimbal assembly according to the present invention is characterized in that the light waveguide includes a core configured to introduce the optical flux emitted from the light source under total reflection conditions and a clad formed of a material having an index of refraction lower than the index of refraction of the core and configured to come into tight contact with the core to seal the core, and the positioning portion is formed integrally with the clad.

According to the head gimbal assembly in the present invention, by forming the positioning portion integrally with the clad, a step of forming the positioning portion does not have to be provided when forming the light waveguide, so that the positioning portion can be formed in the same step as in the related art. Therefore, improvement of the efficiency of manufacturing is achieved.

The head gimbal assembly according to the present invention is characterized in that at least part of the light waveguide includes a core configured to introduce the optical flux emitted from the light source under total reflection conditions and a clad formed of a material having an index of refraction lower than the index of refraction of the core and configured to come into tight contact with the core to seal the core, and the positioning portion is provided on an outer peripheral surface of the clad separately from the clad so as to cover the clad.

In the head gimbal assembly according to the present invention, since the configuration is just to provide the positioning portion on the existing light waveguide, even though the outline of the slider is different depending on a variety of the sliders, the difference of the outline can be accommodated easily only by changing the outline of the positioning portion. In other words, by forming the positioning portion according to the outlines of the respective sliders when assembling the light waveguide to a variety of the sliders, the light waveguide can be fixed to the slider irrespective of the shape of the light waveguide. Therefore, fixation to slider is achieved easily with reduced number of assembly steps. Also, this configuration requires only the provision of the positioning portion on the light waveguide, simplification of the structure and reduction of the cost of manufacturing are achieved.

The head gimbal assembly according to the present invention is characterized in that at least part of the flat surface is provided on the light waveguide and opposes at least one of the slider and the supporting portion.

In the head gimbal assembly according to the present invention, part of the flat surface is formed on the light waveguide, and the flat surface opposes at least one of the slider and the supporting portion. Therefore, the light waveguide can be fixed easily by using this flat surface.

The head gimbal assembly according to the present invention is characterized in that the positioning portion includes a guide groove configured to accommodate the light waveguide, and the light waveguide is introduced to the spotlight generating element in the guide groove.

In the head gimbal assembly according to the present invention, by arranging the positioning portion on the slider the light waveguide can be fixedly positioned to the slider only by arranging the light waveguide in the guide groove formed on the positioning portion. Therefore, the positioning or the fixation of the light waveguide and the slider are facilitated. In addition, by configuring the positioning portion and the light waveguide as separate members, the various types of light waveguides can be fixed according to the application, so that the design flexibility is improved.

The head gimbal assembly according to the present invention is characterized in that at least part of the light waveguide includes a graded index fiber.

In the head gimbal assembly according to the present invention, since the graded index fiber is continuously reduced in index of refraction as it goes from the center toward the outer periphery, an output angle of the optical flux can beset freely by adjusting the length of the graded index fiber. Accordingly, the spot shape of an incident light to the slider can be optimized by adjusting the output angle of the optical flux, so that the spotlight can be generated efficiently by the spot generating element.

The head gimbal assembly according to the present invention is characterized in that at least part of the light waveguide propagates the optical flux using the entire part thereof.

In the head gimbal assembly according to the present invention, the optical flux is propagated using the entire light waveguide. Therefore, the optical path can be elongated while maintaining the incident angle incoming from the proximal side (inflow end). Therefore, an optical path adjustment of the light waveguide is facilitated.

The head gimbal assembly according to the present invention is characterized in that the lateral width and the vertical width of a cross section of the core taken orthogonally to the direction of extension of the core are different from each other.

In the head gimbal assembly according to the present invention, since a vibrating surface of the optical flux emitted from the light source can be maintained in the constant direction by differentiating the lateral width and the vertical width of the core, the optical flux can be introduced to the slider in the state in which a linear polarization is maintained.

The head gimbal assembly according to the present invention is characterized in that the clad is formed with a tunnel portion along the direction of extension of the core.

In the head gimbal assembly according to the present invention, since the vibrating surface of the optical flux emitted from the light source can be maintained in the constant direction by arranging the tunnel portion in the clad, the optical flux can be introduced to the slider in the state in which the linear polarization is maintained.

The head gimbal assembly according to the present invention is, characterized in that the light waveguide includes a stress applying portion for applying a compression stress in the direction orthogonal to the direction of extension of the core.

In the head gimbal assembly according to the present invention, the compression stress is applied to the core by arranging the stress applying portion. Since the compression stress generates a birefringence in the core, and the vibrating surface of the optical flux can be maintained in the constant direction, so that the optical flux can be guided to the slider in a state in which the linear polarization is maintained.

The head gimbal assembly according the present invention is characterized in that the stress applying portions are arranged so as to sandwich both sides of the core.

In the head gimbal assembly according to the present invention, the compression stress is applied evenly to the core by arranging the stress applying portion so as to sandwich the core, so that the linear polarization can be maintained further easily.

The head gimbal assembly according to the present invention is characterized in that the stress applying portion is arranged on the surface of the clad.

In the head gimbal assembly according to the present invention, the compression stress is applied evenly to the core by arranging the stress applying portion so as to sandwich the core, so that the linear polarization can be maintained further easily.

Since the configuration is as simple as only arranging the stress applying portion on the surface of the clad, an increase in manufacturing efficiency is achieved.

The head gimbal assembly according to the present invention is characterized in that the distal end surface of the light waveguide is a mirror surface configured to reflect the optical flux introduced into the light waveguide toward the spotlight generating element.

In the head gimbal assembly according to the present invention, by causing the optical flux propagated in the light waveguide to enter the mirror surface, the optical flux can be reflected from the mirror surface and guided to the spotlight generating element.

The head gimbal assembly according to the present invention is characterized in that a flat surface which is an outer peripheral surface of the clad exposed in a planer shape is formed on the side of the contact surface of the positioning portion with respect to the slider and between the mirror surface and the spotlight generating element.

In the head gimbal assembly according to the present invention, by forming the flat surface, which is the outer peripheral surface of the clad exposed in a planer shape, the interface between the mirror surface and the spotlight generating element is formed into a flat surface. Accordingly, when a collimated light passes through the flat surface, it proceeds straight ahead without being refracted. Therefore, the spot shape of the incident light to the slider can be optimized, so that the spotlight can be generated efficiently by the spot generating element.

The head gimbal assembly according to the present invention is characterized in that the positioning portion is a plate portion.

According to the head gimbal assembly in the present invention, by configuring the positioning portion as the plate portion including the light waveguide, the light waveguide and the slider can be fixed in the positioned state only by fixing the plate portion to the slider. Accordingly, since it is not necessary to apply complicated works on a slider substrate of the slider, or to arrange a light guide member thereon as in the related art, the number of process steps and the cost of manufacturing are reduced, and hence the efficiency of manufacturing can be improved.

Since the light waveguide is not held between two substrates (for example, a near field optical element substrate and a mirror substrate) as in the related art, the cost of manufacturing can be reduced, and the plate thickness of the slider can be restrained, so that size and thickness reduction of the slider is realized.

Here, by reducing the plate thickness of the slider, the distance from the supporting point of the supporting portion of the slider to the fixed point of the light waveguide with respect to the slider is reduced. Accordingly, in a case where the slider varies in position so as to follow the concavity and convexity or the surge of the surface of the recording medium or the side-runout in association with the rotation of the recording medium while the slider performs the recording and reproduction, a rotation moment acting from the light waveguide to the slider is reduced. In other words, the light waveguide is prevented from hindering position control of the slider. Therefore, the stable floating of the slider is maintained and hence the floating height can be minimized, whereby the effects on the floating characteristics of the slider and the tracking accuracy are reduced.

Therefore, since both the light propagation efficiency and the floating characteristics of the slider are ensured, the scanning performance of the slider is improved, and accurate and high-density recording and reproduction of data are achieved.

The head gimbal assembly according to the present invention is characterized in that at least part of the side surface of the plate portion is flush with at least part of the side surface of the slider.

In the head gimbal assembly according to the present invention, with the configuration in which at least one side surface of the plate portion and at least one side surface of the slider are flush with each other, positioning of the both is facilitated at the time of assembly.

The head gimbal assembly according to the present invention is characterized in that the plate portion has a width larger than the width of the light waveguide.

In the head gimbal assembly according to the present invention, by forming the width of the plate portion to be wider than the width of the light waveguide, in a case where the slider varies in position so as to follow the concavity and convexity or the surge of the surface of the recording medium or the side-runout in association with the rotation of the recording medium while the slider performs the recording and reproduction, a load from the suspension can be provided evenly to the slider via the plate portion. In other words, the light waveguide is prevented from hindering position control of the slider. Therefore, the stable floating of the slider is maintained and hence the floating height can be minimized, whereby the effects on the floating characteristics of the slider and the tracking accuracy are reduced.

The head gimbal assembly according to the present invention further includes a connecting portion configured to connect the plate portion and the light waveguide, and is characterized in that the connecting portion gets smaller in cross section as it goes from the plate portion toward the light waveguide.

In the head gimbal assembly according to the present invention, with the connecting portion between the plate portion and the light waveguide formed to get gradually smaller in cross section, the stress acting on the connecting portion can be dispersed. Accordingly, the connecting portion is prevented from braking down by variations in position of the slider when in use or concentration of the stress to the connecting portion occurring at the time of manufacturing.

On the other hand, a data recording and reproducing apparatus according to the present invention includes: a head gimbal assembly according to the present invention described above; a magnetic recording medium configured to rotate in a constant direction; a light source configured to emit an optical flux for heating the magnetic recording medium; a pivot shaft arranged outside the magnetic recording medium; and a carriage being rotatable about the pivot shaft and having an arm portion configured to support the head gimbal assembly.

In the data recording and reproducing apparatus according to the present invention, the recording medium is rotated and then the carriage is rotated about the pivot shaft to cause the slider supported by the arm portion to scan. Then, the slider is arranged at a desired position on the recording medium. Then, the optical flux is caused to enter the light waveguide from the light source. Accordingly, recording and reproduction of various data with respect to the recording medium is achieved by using the slider of the head gimbal assembly.

In particular, since the head gimbal assembly according to the present invention is provided, the data recording and reproduction can be performed accurately at a high density, and hence the high-quality product is achieved.

ADVANTAGES OF THE INVENTION

In the head gimbal assembly according to the present invention, the cost of processing and the cost of manufacturing can be reduced to improve the manufacturing efficiency by performing the arrangement of a light waveguide to a spotlight generating element in a slider easily, and thus a high-performance data recording and reproducing apparatus can be provided.

DETAILED DESCRIPTION OF THE INVENTION

First Embodiment (Data Recording and Reproducing Apparatus)

Figure 1:
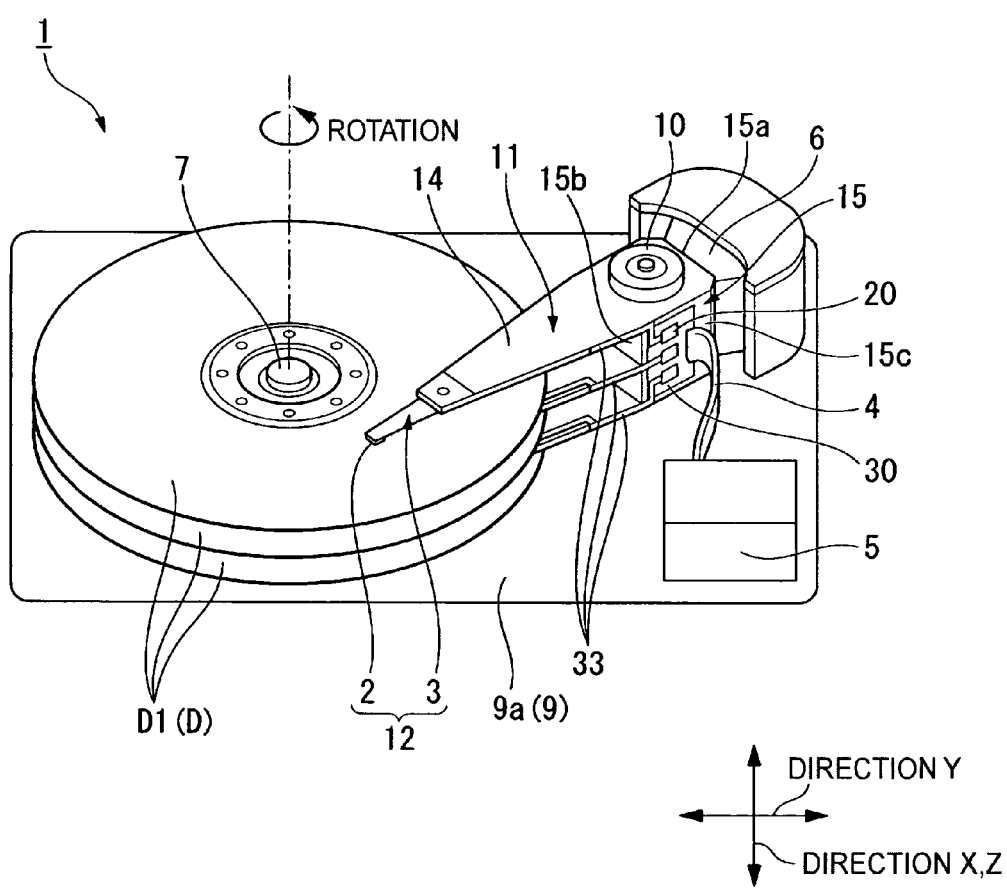
FIG. 1 is a configuration drawing showing an embodiment of a data recording and reproducing apparatus according to the present invention.

Referring now to FIG. 1 to FIG. 9, a first embodiment of the present invention will be described. FIG. 1 is a configuration drawing showing an embodiment of a data recording and reproducing apparatus 1 according to the present invention. The data recording and reproducing apparatus 1 in the present invention is an apparatus configured to write in a vertical recording system in a disk (recording medium) D having a vertical recording layer.

As shown in FIG. 1, the data recording and reproducing apparatus 1 in this embodiment includes a carriage 11, a laser light source 20 configured to supply an optical flux from a proximal side of the carriage 11 via an optoelectrical composite line 33, a head gimbal assembly (HGA) 12 supported at a distal side of the carriage 11, an actuator 6 configured to cause the head gimbal assembly 12 to move for scanning in an XY directions parallel to a disk surface D1 (the surface of a disk D), a spindle motor 7 configured to rotate the disk D toward a predetermined direction, a control unit 5 configured to supply a current modulated according to data to a slider 2 of the head gimbal assembly 12, and a housing 9 configured to accommodate these components in the interior thereof.

The housing 9 is a box-shaped member formed of a metallic material such as aluminum and having an upper opening, and includes a bottom portion 9a being rectangular in top view and peripheral wall (not shown) provided along the peripheral edge of the bottom portion 9a so as to extend upright in the vertical direction with respect to the bottom portion 9a. Then, formed inside surrounded by the peripheral wall is a concave portion for accommodating respective components described above. In FIG. 1, the peripheral wall surrounding the periphery of the housing 9 is omitted for facilitating explanation.

The housing 9 is configured in such a manner that a lid, not shown, is detachably fixed so as to close an opening of the housing 9. The spindle motor 7 described above is mounted on a substantially center of the bottom portion 9a, and the disk D is detachably fixed by fitting a center hole on the spindle motor 7.

Mounted outside the disk D, that is, at a corner portion of the bottom portion 9a is the actuator 6 described above. The carriage 11 which is rotatable with respect to the XY directions about a pivot shaft 10 is mounted on the actuator 6.

The carriage 11 includes an arm portion 14 extending along the disk surface D1 from the proximal end portion toward the distal end portion and a base portion 15 configured to support the arm portion 14 in a cantilevered manner via the proximal end portion formed integrally through a machining process or the like.

The base portion 15 is formed into a parallelepiped shape, and is supported so as to be rotatable about the pivot shaft 10. In other words, the base portion 15 is connected to the actuator 6 via the pivot shaft 10, and the pivot shaft 10 corresponds to a center of rotation of the carriage 11.

The arm portion 14 has a panel shape extending in parallel to the direction of plane of an upper surface of the base portion 15 (XY directions) on a side 15b opposite to a side 15a of the base portion 15 on which the actuator 6 is mounted (the side opposite to the corner portion), and three of such arm portions 14 extend along the direction of height of the base portion 15 (Z direction). More specifically, the arm portions 14 each are formed into a tapered shape reducing in width gradually from the proximal end portion to the distal end portion, and the disks D are sandwiched between the arm portions 14, respectively. In other words, the arm portions 14 and the disks D are arranged alternately, and the arm portions 14 are configured to be movable in the direction parallel to the surfaces of the disks D (XY directions) by the activation of the actuator 6. The carriage 11 and the head gimbal assembly 12 are configured to be retracted from above the disk D by the activation of the actuator 6 when the rotation of the disk D is stopped.

(Head Gimbal Assembly)

The head gimbal assembly 12 is configured to introduce an optical flux from the laser light source 20 to the slider 2 as a near field optical head having a spot size converter (spotlight or near-field light generating element) 40 (see FIG. 5) described later to cause generation of a near field light (spotlight), and to record and reproduce various data in the disks A using the near field light.

Figure 2:
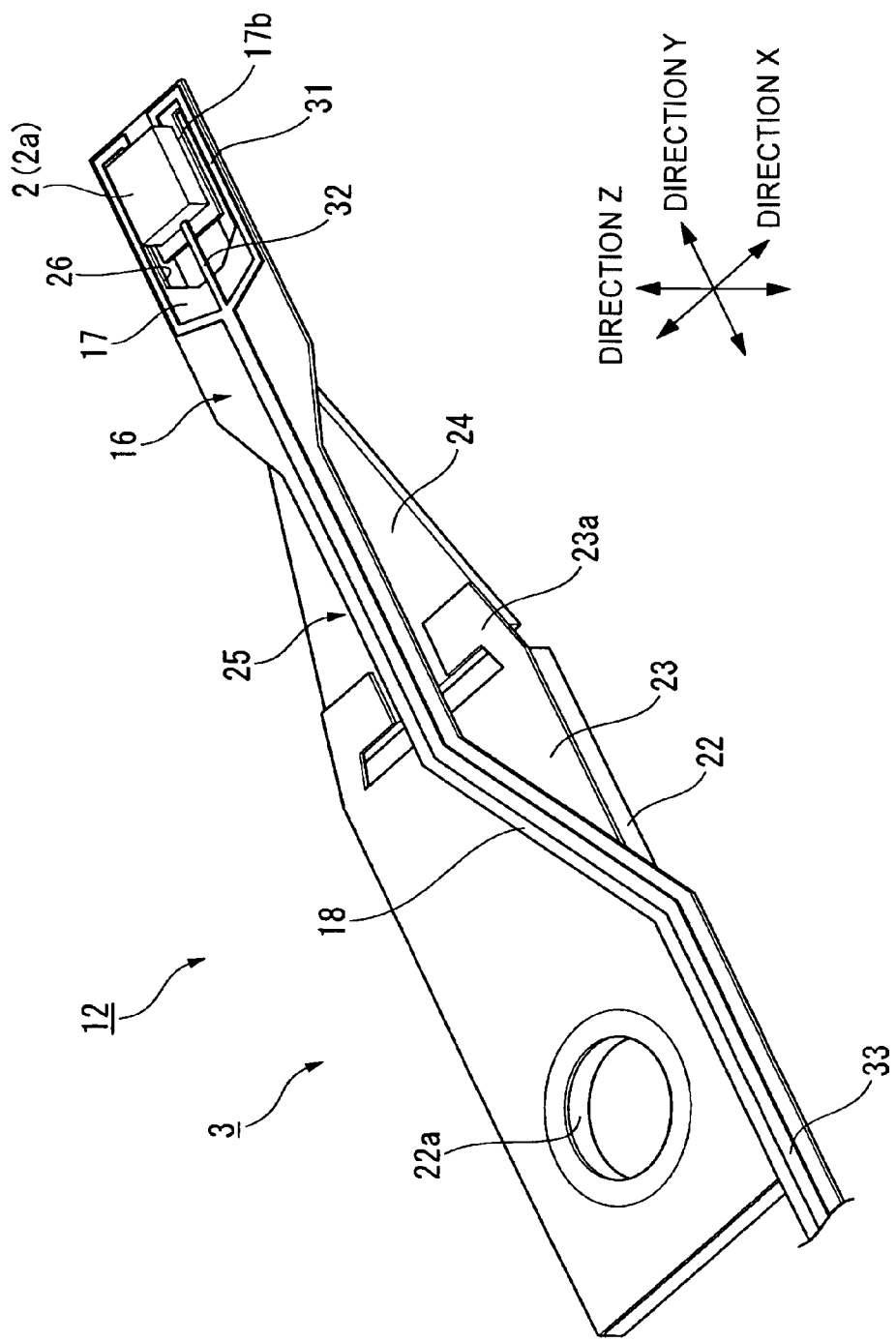
FIG. 2 is a perspective view of a head gimbal assembly shown in FIG. 1.
Figure 3:
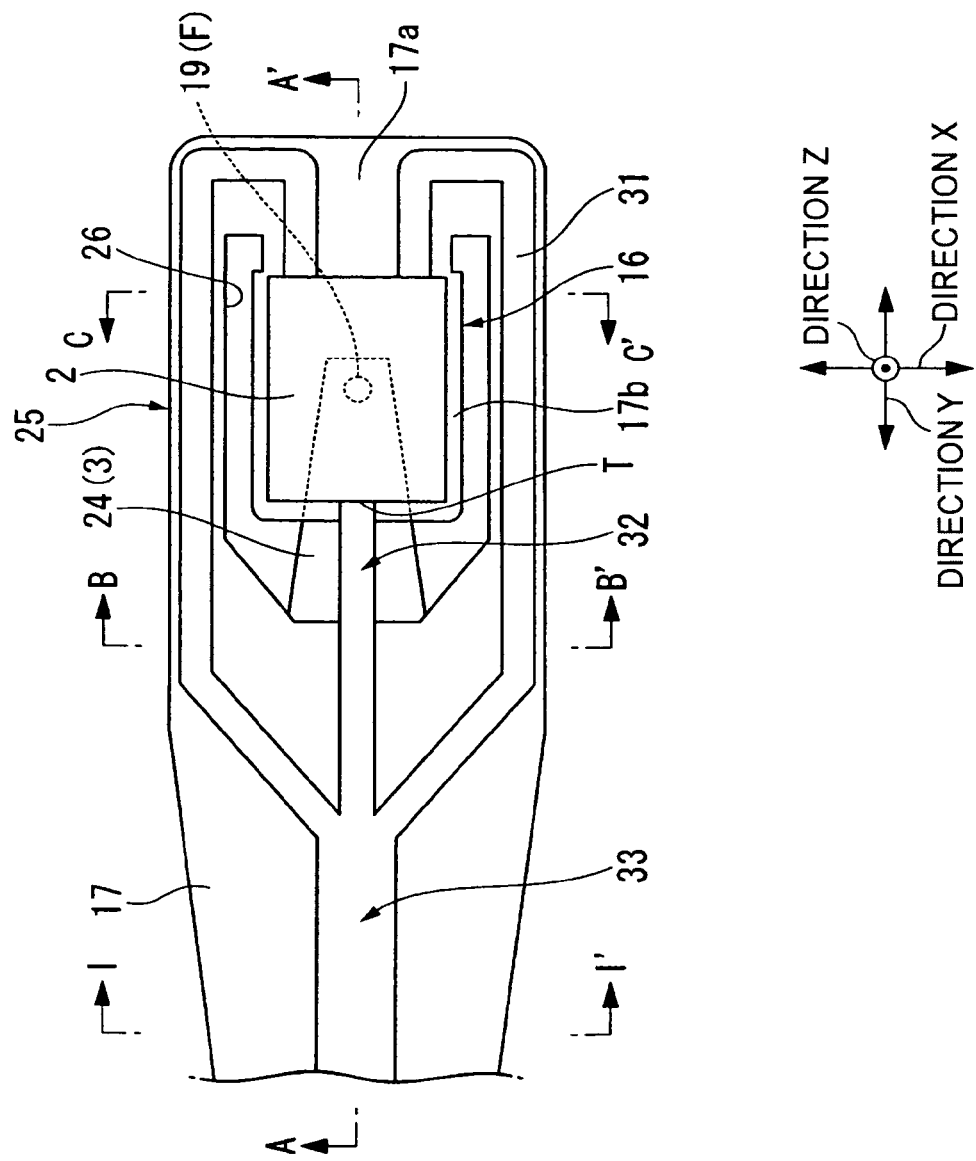
FIG. 3 is a plan view of a gimbal shown in FIG. 2.
Figure 4:
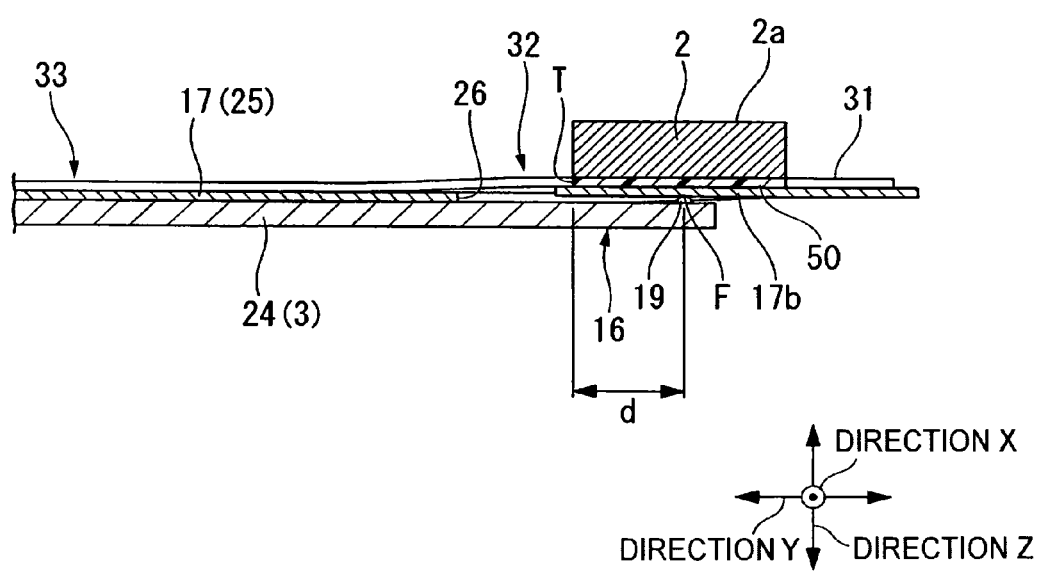
FIG. 4 is a cross-sectional view taken along the line A-A' in FIG. 3 according to a first embodiment.
Figure 5:
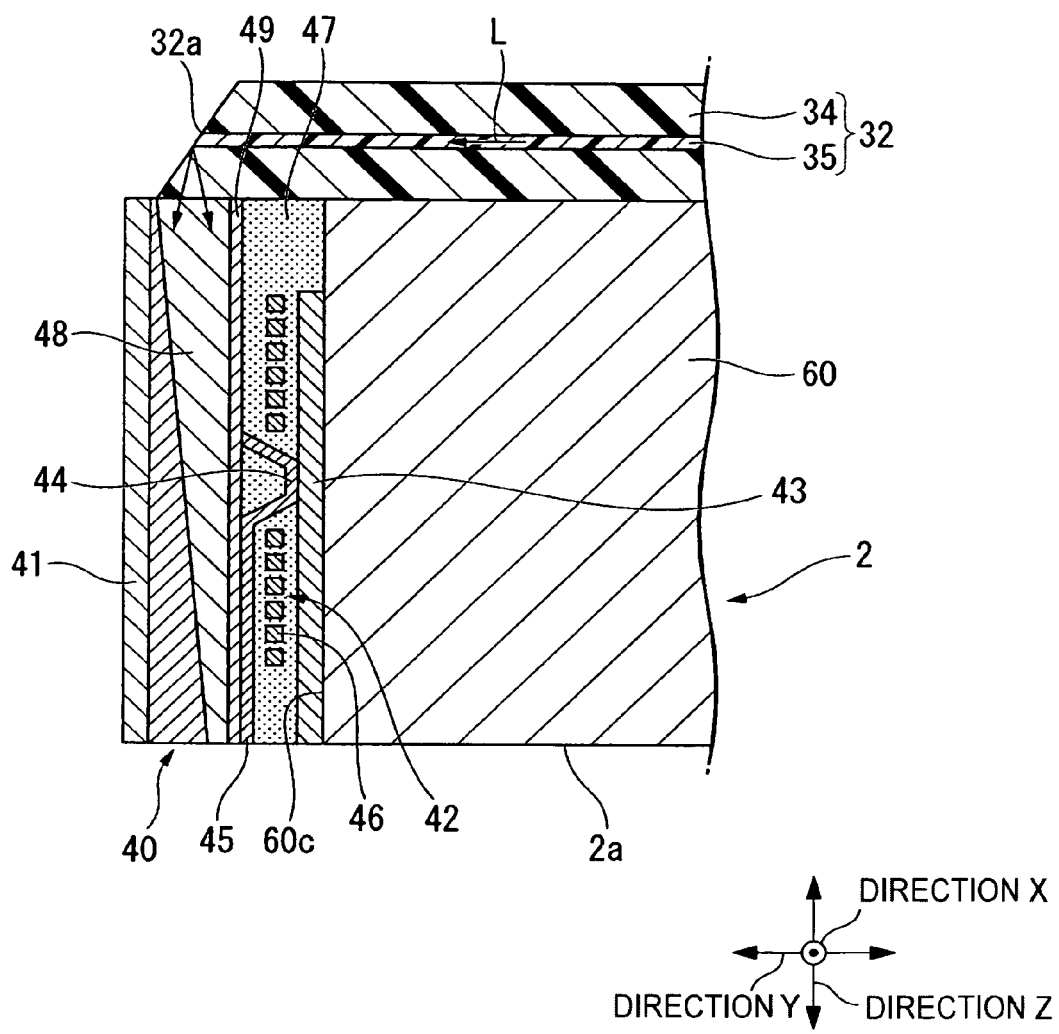
FIG. 5 is an enlarged cross-sectional view of a slider according to the first embodiment.

FIG. 2 is a perspective view of a suspension 3 viewed from the slider 2 side in a state in which the slider 2 is faced upward. FIG. 3 is a plan view of a gimbal 17 in the state in which the slider 2 is faced upward. FIG. 4 is a cross-sectional view taken along the line A-A' in FIG. 3, and FIG. 5 is an enlarged cross-sectional view of the slider.

As shown in FIG. 2 to FIG. 5, the head gimbal assembly 12 in this embodiment has a function to float the slider 2 described above from the disk D, and includes the slider 2, the suspension 3 formed of a metallic material into a thin plate shape and being capable of moving in the XY directions parallel to the disk surface D1, and a gimbal means 16 configured to fix the slider 2 on a lower surface of the suspension 3 in a state of being capable of rotating about two axes (X-axis, Y-axis) parallel to the disk surface D1 and orthogonal to each other, that is, so as to be twistable about the two axes.

(Slider)

The slider 2 is supported in a state of being arranged between the disk D and the suspension 3 with the gimbal 17, described later, interposed between the lower surface of the suspension 3 and the slider 2.

As shown in FIG. 5, the slider 2 includes a slider substrate 60 arranged so as to oppose the disk D (see FIG. 1) in a state of floating from the disk surface D1 by a predetermined distance and having a floating surface 2a opposing the disk surface D1, a recording element 42 fixed to a distal end surface (outflow end) 60c of the slider substrate 60, the above-described spot size converter 40 fixed at a position adjacent to the recording element 42, and a reproducing element 41 fixed to the opposite side of the recording element 42 with the intermediary of the spot size converter 40. In other words, the recording element 42, the spot size converter 40, and the reproducing element 41 are arranged in line on the distal end surface 60c of the slider substrate 60. Incidentally, the distal side of the slider 2 in the longitudinal direction (Y direction) is closest to the disk surface D1. Therefore, by arranging the recording element 42, the spot size converter 40, and the reproducing element 41 on the side of the distal end surface 60c of the slider substrate 60, the recording element 42, the spot size converter 40, and the reproducing element 41 can be brought as close to the disk surface D1 as possible. Therefore, a coercive force of the disk D can be lowered and hence writing into the disk D is easily achieved.

The slider substrate 60 is formed of a light-transmitting material such as quartz glass, ceramic or the like such as AlTiC (altic) into a parallelepiped shape. This slider substrate 60 is supported so as to be suspended from a distal end of the suspension 3 (see FIG. 3) via the gimbal 17 (see FIG. 3) with the floating surface 2a faced toward the disk D.

The reproducing element 41 is a magnetoresistive effect film configured to change in electric resistance according to the magnitude of a magnetic field leaked from the disk D. A bias current is supplied to the reproducing element 41 from the control unit 5 (see FIG. 1) via an electric line 31, described later. Accordingly, the control unit 5 is able to detect the change of the magnetic field leaked from the disk D as the change of the voltage, so that reproduction of a signal may be performed from the change of the voltage.

The recording element 42 includes a secondary magnetic pole 43 fixed to the distal end surface 60c of the slider substrate 60, a main magnetic pole 45 connected to the secondary magnetic pole 43 via a magnetic circuit 44 and configured to generate a recording magnetic field vertical to the disk D between itself and the secondary magnetic pole 43, and a coil 46 wound around the magnetic circuit 44 about the magnetic circuit 44 in a spiral shape. The both magnetic poles 43, 45 and the magnetic circuit 44 are formed of a high-saturated magnetic flux density (Bs) material (for example, CoNiFe alloy, CoFe alloy, and so on), which is high in magnetic flux density. The coil 46 is arranged so as to have a gap between adjacent coil wires, between themselves and the magnetic circuit 44, and between the both magnetic poles 43, 45 to avoid a short circuit, and are molded in this state with an insulator 47. Then, the coils 46 are configured to receive a supply of the electric current modulated according to the data from the control unit 5. The main magnetic pole 45 and the secondary magnetic pole 43 are designed in such a manner that the end surfaces thereof opposing the disk D are flush with the floating surface 2a of the slider 2 (the slider substrate 60).

The spot size converter 40 is a substantially plate-shaped element configured to generate spotlight from an optical flux L introduced from the proximal side and emit the spotlight from the distal side outward, and includes an SSC (spot size converter) core 48 and a SSC clad 49. The spot size converter 40 configured in this manner is fixed adjacent to the main magnetic pole 45 with the proximal side faced upward of the slider 2 (upward along the Z-axis) and the distal side faced toward the disk D, and generates spotlight near the main magnetic pole 45.

The SSC core 48 is a member tapered so as to be reduced in cross-section taken in the direction orthogonal to the longitudinal direction (Z direction) from the proximal side toward the distal side and configured to generate spotlight by propagating the optical flux L introduced from the proximal side toward the distal side while focusing the same in the interior thereof. In this embodiment, the SSC core 48 is formed to have three side surfaces (substantially triangular shape in cross-section), and is arranged with one of these side surfaces opposed to the main magnetic pole 45. The end surface of the SSC core 48 is designed so as to be flush with the floating surface 2a of the slider 2.

The SSC clad 49 is formed of a material having an index of refraction lower than that of the SSC core 48 and is configured to seal the SSC core 48 by being in tight contact with the SSC core 48. The SSC clad 49 is formed so as to fill a gap between the reproducing element 41 and the recording element 42. Then, the optical flux L supplied from a light waveguide 32, described later, is introduced to an end surface on the distal side under total reflection conditions owing to the difference in index of refraction between the SSC core 48 and the SSC clad 49.

An example of a combination of materials used as the SSC clad 49 and the SSC core 48 will be given. For example, a combination such that the SSC core 48 is formed of quartz ($SiO_2$), and the SSC clad 49 is formed of quartz doped with fluorine is contemplated. In this case, when the wavelength of the luminous flux L is 400 nm, the index of refraction of the SSC core 48 is 1.47, and the index of refraction of the SSC clad 49 is smaller than 1.47, so that it is a preferable combination. Also, a combination such that the SSC core 48 is formed of quartz doped with germanium and the SSC clad 49 is formed of quartz ($SiO_2$) is also contemplated. In this case, when the wavelength of the luminous flux L is 400 nm, the index of refraction of the SSC core 48 is larger than 1.47, and the index of refraction of the SSC clad 49 is 1.47, so that it is a preferable combination.

In particular, the larger the difference in index of refraction between the SSC core 48 and the SSC clad 49 is, the larger the force to confine the luminous flux L in the SSC core 48 becomes, so that the difference in index of refraction of the both is preferably increased by using tantalum oxide ($Ta_2O_5$; when the wave length is 550 nm, the index of refraction is 2.16) for the SSC core 48, and using quartz or the like for the SSC clad 49. Also, when using the luminous flux L in an infrared area, it is also effective to form the SSC core 48 of silicon (Si: the index of refraction is about 4) as a transparent material for an infrared light.

As shown in FIG. 2 to FIG. 5, the lower surface of the slider 2 (slider substrate 60) corresponds to the floating surface 2a opposing the disk surface D1 as described above. The floating surface 2a is a surface for causing a pressure for floating from the viscosity of airflow generated by the rotating disk D and is referred to as ABS (Air Bearing Surface). More specifically, it is designed to float the slider 2 in an optimal state by adjusting a positive pressure to cause the slider 2 to move away from the disk surface D1 and a negative pressure to cause the slider 2 to be attracted toward the disk surface D1.

The floating surface 2a of the slider 2 receives a force to float from the disk surface D1, and the suspension 3 receives a force to be pressed toward the disk D. Therefore, the slider 2 is adapted to float from the disk surface D1 by a balance of the both forces.

(Suspension)

As shown in FIGS. 2 and 3, the suspension 3 described above includes a base plate 22 formed into a substantially square shape in top view and a load beam 24 formed into a substantially triangular shape in plan view connected to the distal side of the base plate 22 via a hinge plate 23.

The base plate 22 is formed of a thin metallic material such as stainless steel, and is formed with an opening 22a penetrated through the direction of thickness on the proximal side. The base plate 22 is adapted to be fixed to the distal end of the arm portion 14 via the opening 22a. The base plate 22 includes the sheet-shaped hinge plate 23 formed of a metallic material such as stainless steel arranged on the lower surface thereof. The hinge plate 23 is a plate-shaped member formed over the entire lower surface of the base plate 22, and the distal end portion thereof is formed as an extending portion 23a extending along the longitudinal direction of the base plate 22 from the distal end of the base plate 22. The two extending portions 23a extend from both widthwise end portions of the hinge plate 23, and the load beam 24 is connected to the distal end portions thereof.

The load beam 24 is formed of a thin metallic material such as stainless steel like the base plate 22, and is connected to the hinge plate 23 with a gap formed between the proximal end thereof and the distal end of the base plate 22. Accordingly, the suspension 3 is adapted to be flexible in the Z direction vertical to the disk surface D1 by bending about a portion between the base plate 22 and the load beam 24.

Provided on the suspension 3 is a flexure 25. The flexure 25 is a sheet-shaped member formed of a metallic material such as stainless steel, and is adapted to be flexible in the direction of thickness by being formed into a sheet-shape. The flexure 25 is fixed to the load beam 24 on the distal side thereof, and includes the gimbal 17 formed to have an outline of a substantially pentagonal shape in top view, and a supporting member 18 formed to be narrower than the gimbal 17 extending from the proximal end of the gimbal 17 along the top of the suspension 3.

The gimbal 17 is formed so as to warp slightly in the thickness direction toward the disk surface D1 from near the midsection to the distal end thereof. In order to avoid the contact of the warped distal side with the load beam 24, the portion of the gimbal 17 from the proximal side to the substantially midsection is fixed to the load beam 24.

Formed on the distal side of the gimbal 17 in the floating state is a notch 26 penetrated therethrough so as to have an angular U-shaped periphery, and a pad portion (supporting portion/support section) 17b cantilevered by a joint portion 17a is formed in an area surrounded by the notch 26. In other words, the pad portion 17b is formed so as to protrude from the distal side to the proximal side of the gimbal 17 via the joint portion 17a, and the notch 26 is formed therearound. Accordingly, the pad portion 17b is adapted to be flexible in the direction of thickness of the gimbal 17, and the angle is adjusted so that only the pad portion 17b extend in parallel to the lower surface of the suspension 3. Then, the slider 2 is placed on the pad portion 17b described above and fixed thereto. In other words, the slider 2 is suspended from the load beam 24 via the pad portion 17b.

As shown in FIG. 2 to FIG. 4, a projecting portion 19 protruding toward substantially centers of the pad portion 17b and the slider 2 is formed at a distal end of the load beam 24. The distal end of the projecting portion 19 is rounded. The projecting portion 19 is adapted to come into point contact with the front surface (upper surface) of the pad portion 17b when the slider 2 floats toward the load beam 24 by a wind pressure received from the disk D. In other words, the projecting portion 19 supports the slider 2 via the pad portion 17b of the gimbal 17, and is adapted to apply a load to the slider 2 toward the disk surface D1 (in the Z direction). The contact point (supporting point) between the projecting portion 19 and the pad portion 17b corresponds to a load point F of the slider 2 applied by the projecting portion 19. The projecting portion 19 and the gimbal 17 having the pad portion 17b constitute the gimbal means 16.

The supporting member 18 show in FIG. 2 is a sheet-type member formed integrally with the gimbal 17, and extends on the suspension 3 toward the arm portion 14. In other words, the supporting member 18 is configured to follow the deformation of the suspension 3 when the suspension 3 is deformed. The supporting member 18 is drawn from the surface of the arm portion 14 to the side surface, and then to the base portion 15 of the carriage 11.

(Light Waveguide)

Figure 6:
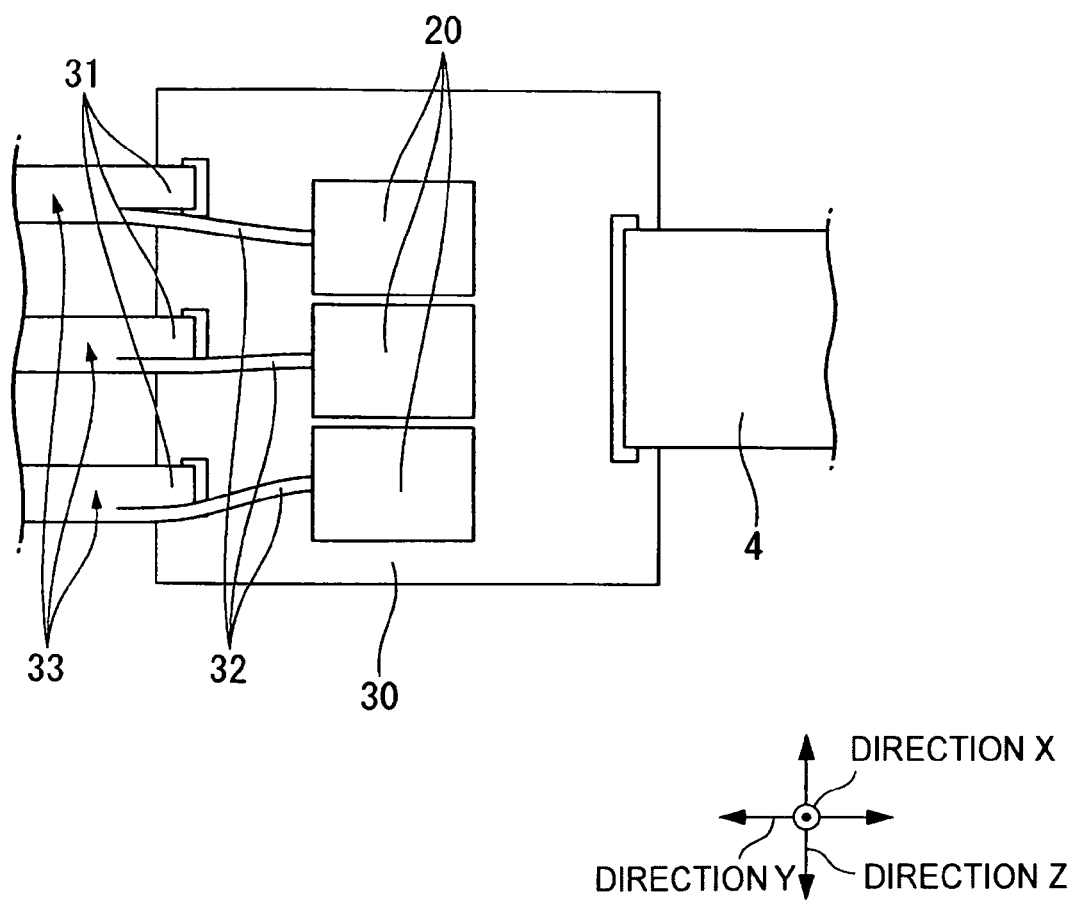
FIG. 6 is a plan view of a terminal substrate shown in FIG. 1.

FIG. 6 is a plan view of a terminal substrate 30 attached to the base portion 15 of the carriage 11.

As shown in FIGS. 1 and 6, the terminal substrate 30 is arranged on a side surface 15c of the base portion 15 of the carriage 11. The terminal substrate 30 serves as a relay point when the control unit 5 provided in the housing 9 and the slider 2 are electrically connected, and is formed with various control circuits (not shown) on the surface thereof. The control unit 5 and the terminal substrate 30 are electrically connected via a flexible flat cable 4. On the other hand, the terminal substrate 30 and the slider 2 are connected via the electric lines 31. The three sets of the electric lines 31 are provided corresponding to the number of the sliders 2 provided on the respective carriages 11, and signals output from the control unit 5 via the flat cable 4 are output to the slider 2 via the electric lines 31.

Arranged on the terminal substrate 30 are laser light sources 20 described above configured to supply optical fluxes toward the spot size converters 40 of the sliders 2. The laser light source 20 is configured to receive a signal output from the control unit 5 via the flat cable 4, and emit an optical flux on the basis of the signal. Three laser light sources 20 are arranged along the direction of the height (Z direction) of the base portion 15 corresponding to the number of the sliders 2 provided on the respective arm portions 14. The light waveguide 32 configured to introduce the optical flux emitted from the each laser source 20 to a condenser lens is connected to the outgoing side of the each laser light source 20.

As shown in FIGS. 2 and 3, the light waveguide 32 and a set of the electric lines 31 corresponding to the each slider 2 are configured as the optoelectrical composite line 33 formed integrally from the proximal side to the distal end between the laser light source 20 and the slider 2. The optoelectrical composite line 33 passes from the surface of the terminal substrate 30 through the side surface of the arm portion 14 and is drawn onto the arm portion 14. More specifically, the optoelectrical composite line 33 is arranged on the above-described supporting member 18 on the flexure 25 on the arm portion 14 and the suspension 3, and is drawn to the distal end of the suspension 3 with the intermediary of the supporting member 18 therebetween.

The optoelectrical composite line 33 is branched into the electric lines 31 and the light waveguide 32 at the distal end of the suspension 3, that is, at the midpoint of the gimbal 17. More specifically, the light waveguide 32 extends from the branch point on the distal side of the optoelectrical composite line 33 along the longitudinal direction of the gimbal 17, and is connected directly to the proximal side of the slider 2 across the notch 26 of the gimbal 17. The light waveguide 32 is apart from the lower surface of the gimbal 17 at the branch point of the optoelectrical composite line 33, and extends from the branch point toward the proximal side of the slider 2 so as to bridge between the pad portion 17b and the gimbal 17 in a slightly floating state. In other words, the light waveguide 32 is drawn from the widthwise (X direction) center portion of the slider 2 toward a proximal end surface 2b of the slider 2 in a state of extending substantially linearly (substantially infinite radius of curvature) on the lower surface of the gimbal 17.

In contrast, the electric line 31 is bent toward the outer peripheral portion of the gimbal 17 at the branch point, and is drawn from the outer peripheral portion of the gimbal 17, that is, from the outside of the notch 26. Then, the electric line 31 drawn from the outside of the notch 26 passes over the joint portion 17a and is connected to the slider 2 on the side of the distal end surface thereof. In other words, the electric line 31 is connected directly from outside the slider to the above-described reproducing element 41 and the recording element 42 provided on the slider 2 on the side of the distal end surface thereof.

Figure 7:
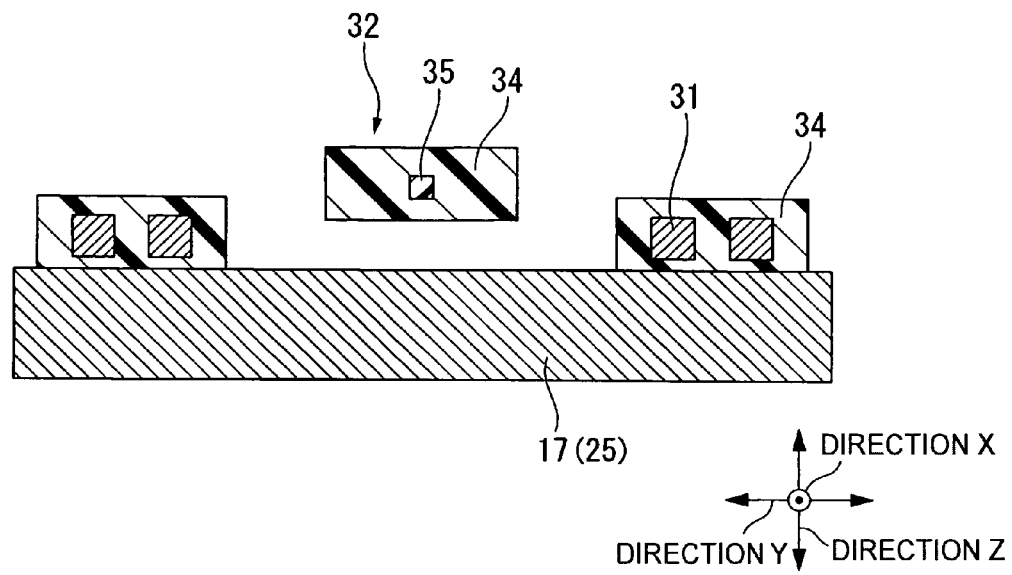
FIG. 7 is a cross-sectional view taken along the line B-B' in FIG. 3 according to the first embodiment.

FIG. 7 is a cross-sectional view taken along the line B-B' in FIG. 3.

As shown in FIG. 7, the electric lines 31 which constitute the optoelectrical composite line 33 are formed of aluminum or copper, and are confined in clads 34 together with cores 35. In contrast, the light waveguide 32 which constitutes the optoelectrical composite line 33 has a rectangular shape in cross-section having the core 35 having a thickness of 3 to 10 μm, for example, and guiding the optical flux emitted from the laser light source 20 under the total reflection conditions and the clad 34 formed of a material having an index of refraction lower than that of the core 35 to have a thickness of several tens of μm for sealing the core 35 by coming into tight contact with the core 35. Then, the optical flux emitted from the laser light source 20 is introduced to the condenser lens of the slider 2 under the total reflection conditions depending on the difference in index of refraction between the core 35 and the clad 34.

The material of the light waveguide 32 that can be used may be the same material as the SSC core 48 and the SSC clad 49 (see FIG. 5 for both) described above. However, in this embodiment, the resin material as shown below is suitably used. For example, a combination such as forming the core 35 of PMMA (methyl methacrylate resin) to have a thickness of 3 to 10 μm and forming the clad 34 of fluorine-contained polymer to have a thickness of several tens of μm is contemplated. It is also possible to form both the core 35 and the clad 34 of epoxy resin (for example, index of refraction of core: 1.522 to 1.523, index of refraction of clad: 1.518 to 1.519) or of fluorinated polyimide. In this case, the difference in index of refraction of the core 35 and the clad 34 is preferably increased by adjusting the composition of the resin material which constitutes the both. For example, in the case of the fluorinated polyimide, the index of refraction can be controlled by adjusting the amount of content of fluorine or by irradiating with energy such as emitted light or the like. In this manner, by using the resin material as a construction material of the light waveguide 32, the optoelectrical composite line 33 can be manufactured through the semiconductor process.

(Plate Portion)

Figure 8:
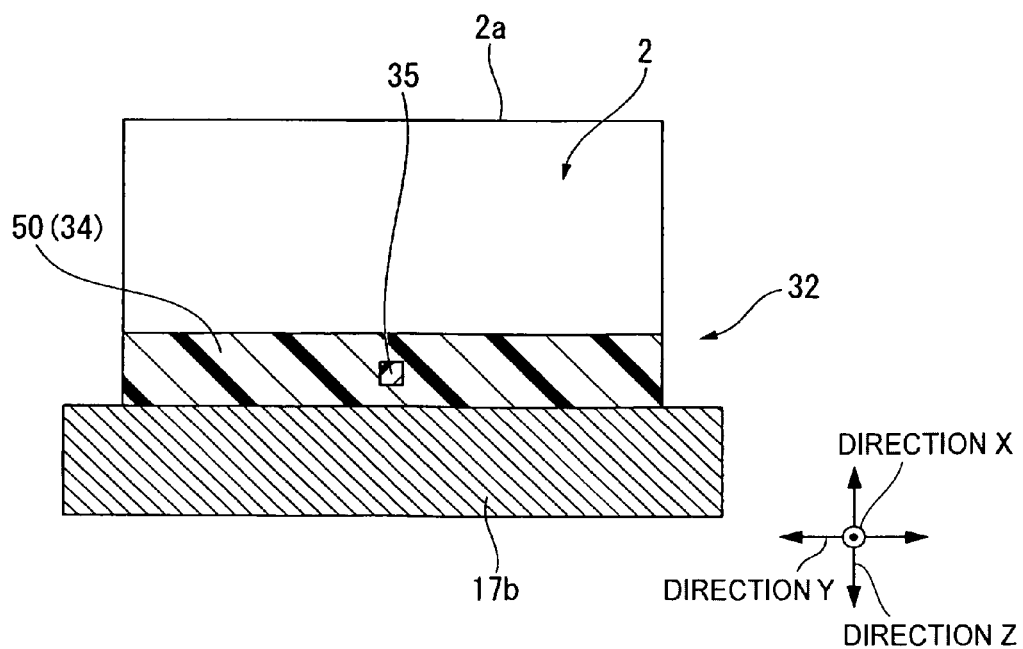
FIG. 8 is a cross-sectional view taken along the line C-C' in FIG. 3 according to the first embodiment.
Figure 9:
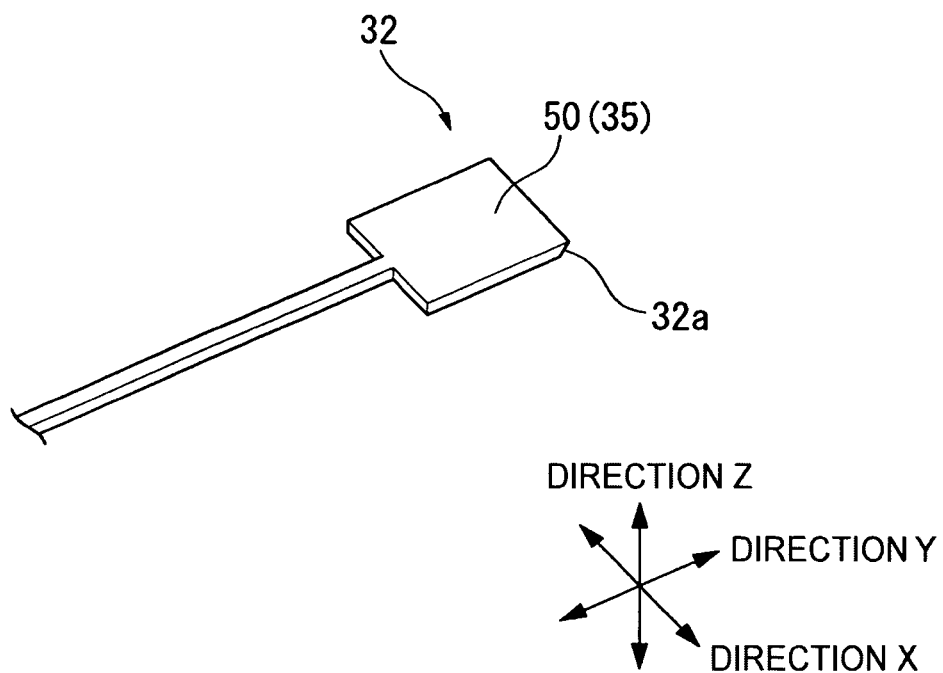
FIG. 9 is a perspective view showing a distal end portion of a light waveguide according to the first embodiment.

Here, FIG. 8 is a cross-sectional view taken along the line C-C' in FIG. 3, and FIG. 9 is a perspective view showing a distal end portion (plate portion) of the light waveguide.

As shown in FIGS. 4, 5, 8, and 9, the distal end portion of the light waveguide 32 is integrally formed with a plate portion (positioning portion or section) 50, which is the distal end portion of the light waveguide 32 enlarged in the widthwise direction (Y direction). More specifically, the plate portion 50 is a member having a rectangular shape in plan view, which is formed by enlarging only the clad 34 of the light waveguide 32 in the widthwise direction (Y direction), and is formed into the equivalent shape as the upper surface (XY plane) of the slider 2. In this manner, by integrally forming the plate portion 50 with the clad 34, a step of forming the plate portion 50 does not have to be provided when forming the light waveguide 32, so that the plate portion 50 can be formed in the same step as in the related art. Therefore, improvement of the efficiency of manufacturing is achieved.

The plate portion 50 is bonded and fixed onto the pad portion 17b, and the slider 2 is fixed onto the pad portion 17b with the intermediary of the plate portion 50. In other words, the machining process for connecting the light waveguide 32 is not performed on the slider substrate 60 of the slider 2, and the slider 2 and the light waveguide 32 are fixed only by bonding the slider 2 on the plate portion 50. Then, the core 35 of the light waveguide 32 extends from the proximal side to the distal side of the slider 2 at the widthwise center portion in the plate portion 50, and is guided to the spot light converter 40 described above.

A point farthest from the above-described load point F of the area where the slider substrate 60 and the light waveguide 32 (plate portion 50) are bonded and fixed is defined as a fixed point T between the light waveguide 32 and the slider 2. The fixed point T is set to a widthwise (X direction) center portion of the slider 2, the proximal end portion in the longitudinal direction (Y direction) and the upper end portion in the thickness direction (Z direction). Therefore, a spatial distance from the above-described load point F, that is, from a contact point between the projecting portion 19 of the suspension 3 and the upper surface of the pad portion 17b to the fixed point T is set to be a distance d.

The proximal end surface of the light waveguide 32 and the proximal end surface of the plate portion 50, and both side surfaces of the light waveguide 32 and the plate portion 50 are flush with each other respectively, and the distal end surface of the plate portion 50 is cut toward the direction intersecting the axial direction (direction of extension) of the light waveguide 32 (for example, approximately 45 degrees). Then, the cross section constitutes a mirror surface 32a for reflecting the optical flux L (see FIG. 5) propagating in the core 35 in the direction different from the direction of introduction. The mirror surface 32a reflects the optical flux L introduced by the light waveguide 32 so as to change the direction of the optical flux L by substantially 90 degrees. Accordingly, the optical flux L reflected from the mirror surface 32a is introduced into the above-described spot size converter 40. The mirror surface 32a may be configured to be formed by forming a reflecting panel of aluminum or the like in an area including at least the core 35 through an evaporation method or the like.

(Data Recording and Reproducing Method)

Subsequently, a procedure of recording and reproducing the various data in and from the disk D by the data recording and reproducing apparatus 1 configured as described above will be described.

First of all, the spindle motor 7 is activated to rotate the disk D in a predetermined direction. Subsequently, the actuator 6 is activated to rotate the carriage 11 about the pivot shaft 10 as a center of rotation, and cause the head gimbal assembly 12 to scan in XY directions via the carriage 11. Accordingly, the slider 2 can be positioned at a desired position on the disk D.

In this case, the slider 2 is supported by the suspension 3 and pressed toward the disk D with a predetermined force. Simultaneously, the slider 2 receives a floating force by being affected by the wind pressure generated by the rotating disk D because the floating surface 2a opposes the disk D. The slider 2 is kept in a floating state at a position apart from the surface of the disk D owing to the balance between these two forces.

In this case, the slider 2 receives the wind pressure, and hence is pressed toward the suspension 3. Therefore, the pad portion 17b of the gimbal 17 which fixes the slider 2 and the projecting portion 19 formed on the suspension 3 are brought into point-contact with each other. Then, the floating force is transferred to the suspension 3 via the projecting portion 19, and acts on the suspension 3 to deform the same in the Z direction vertical to the disk surface D1. Accordingly, the slider 2 floats as described above. When the wind pressure in the XY directions is applied to the slider 2 due to the concavity and convexity of the disk D or the surge, the slider 2 and the pad portion 17b are adapted to be twisted about the projecting portion 19 with respect to the two axes, namely, the X-axis and the Y-axis. Accordingly, displacement in the Z direction (displacement in the direction substantially orthogonal to the disk surface D1) due to the surge of the disk D can be absorbed, so that the position of the slider 2 is stabilized.

The slider 2 is also configured to be twisted with respect to the XY axis via the gimbal means 16, that is, the pad portion 17b which is in point contact with the distal end of the projecting portion 19 even though the wind pressure generated by the surge of the disk D (the wind pressure in the XY directions) is applied thereto. Therefore, the displacement in the Z direction due to the surge is absorbed, and the position of the slider 2 in the floating state can be stabilized.

Here, according to the data recording and reproducing apparatus 1 in this embodiment, the plate portion 50 including the light waveguide 32 is arranged between the pad portion 17b and the slider 2. In this configuration, the light waveguide 32 is not held between two substrates (for example, a near field optical element substrate and a mirror substrate) as in the related art, the plate thickness of the slider 2 (Z direction) can be reduced.

By reducing the plate thickness of the slider 2, the distance between the fixed point T where the slider 2 and the light waveguide 32 are fixed and the load point F (projecting portion 19) which applies a load to the slider 2 in the thickness direction (Z direction) is reduced. Furthermore, by setting the fixed point T at the widthwise (X direction) center portion of the slider 2, the fixed point T and the load point F matches in the direction of the width of the slider 2, so that the widthwise (X direction) distance from the load point F to the fixed point T can be reduced. Accordingly, the spatial distance d between the fixed point T and the load point F is reduced.

Therefore, in a case where the slider 2 varies in position so as to follow the concavity and convexity or the surge of the disk surface D1 or the side-runout in association with the rotation of the disk D while the slider 2 performs the recording and reproduction, a rotation moment acting from the light waveguide 32 to the slider 2 is reduced. Since the plate portion 50 is formed into an outline equivalent to that of the upper surface (XY plane) of the slider 2, the load from the suspension 3 can be applied uniformly to the slider via the plate portion 50. In other words, the light waveguide 32 is prevented from hindering position control of the slider 2. Therefore, the stable floating of the slider 2 is maintained and hence the floating height can be minimized, whereby the effects on the floating characteristics of the slider 2 and the tracking accuracy are reduced. Therefore, since both the light propagation efficiency and the floating characteristics of the slider 2 are ensured, the scanning performance of the slider 2 is improved, and accurate and high-density data recording and reproduction are achieved.

When recording the data here, the control unit 5 activates the laser light source 20 and activates the recording element 42 by supplying an electric current modulated according to the data to the coil 46.

First of all, the optical flux is directed from the laser light source 20 to the light waveguide 32 (the optoelectrical composite line 33), and the optical flux L is introduced to the slider 2. The optical flux L emitted from the laser light source 20 proceeds in the core 35 of the light waveguide 32 toward the distal end (outflow end), is reflected from the mirror surface 32a, and is introduced into the SSC core 48 of the spot size converter 40. The optical flux L introduced into the SSC core 48 is propagated while repeating reflection between the SSC core 48 and the SSC clad 49 of the spot size converter 40 toward the other end side, which is located on the side of the disk D.

In this case, the SSC core 48 is tapered in such a manner that the cross-sectional area orthogonal to the longitudinal direction (Z direction) extending from the proximal side to the distal side is gradually reduced. Therefore, the optical flux is propagated in the SSC core 48 while being gradually focused when passing through the spot size converter 40. Therefore, the optical flux L is squeezed when reaching the distal side of the SSC core 48, and hence the spot size is reduced. Accordingly, a spotlight can be generated, and can be emitted from the end surface on the proximal side to the outside. Then, the disk D is locally heated by the spotlight, and the coercive force is temporarily lowered.

In contrast, when an electric current is supplied to the coil 46 by the control unit 5, the current magnetic field generates a magnetic field in the magnetic circuit 44 on the basis of the principle of the electromagnet, and hence the recording magnetic field in the vertical direction with respect to the disk D may be generated between the main magnetic pole 45 and the secondary magnetic pole 43. Consequently, the recording of data on the basis of a hybrid magnetic recording system in which the spotlight and the recording magnetic field generated at both magnetic poles 43, 45 are cooperated is achieved. In addition, since the recording is performed by the vertical recording system, a stable recording is achieved without being affected by the phenomenon of the heat fluctuations. Therefore, improvement of the writing reliability is achieved. In addition, since a peak position of the heating temperature can be set to a position on which the recording magnetic field is locally acts, the coercive force at a predetermined position of the disk D can be lowered. Therefore, the recording is achieved reliably, improvement of the reliability is achieved, and the higher density recording is enabled.

Subsequently, when reproducing the data recorded in the disk D, the reproducing element 41 fixed adjacently to the spot size converter 40 receives the magnetic field leaked from the disk D, and the electric resistance is changed according to the magnitude thereof. Therefore, the voltage of the reproducing element 41 is changed. Accordingly, the control unit 5 is able to detect the change of the magnetic field leaked from the disk D as the change of the voltage. Then, the control unit 5 reproduces the signal from the change of the voltage, so that the reproduction of the data is achieved.

In this manner, recording and reproduction of various data are achieved using the slider 2 with respect to the disk D.

Here, according to the data recording and reproducing apparatus 1 in this embodiment, the plate portion 50 including the light waveguide 32 is arranged between the pad portion 17b and the slider 2.

In this configuration, by arranging the plate portion 50 including the light waveguide 32 between the pad portion 17b and the slider 2, the light waveguide 32 can be arranged together with the plate portion 50, so that the light waveguide 32 can be introduced to the spot size converter 40 of the slider 2 easily.

Therefore, since it is not necessary to apply complicated works on the slider substrate 60 of the slider 2, or to arrange the light guide member thereon, the number of process steps and the cost of manufacturing are reduced, and hence the efficiency of manufacturing can be improved. Since the light waveguide 32 can be fixed to the slider 2 only by fixing the plate portion 50 to the slider 2, positioning or fixation between the light waveguide 32 and the slider 2 are facilitated.

Since the light waveguide is not held between two substrates (for example, the near field optical element substrate and the mirror substrate) as in the related art, the cost of manufacturing can be reduced, and the plate thickness of the slider can be restrained, so that size and thickness reduction of the slider is realized.

In this manner, the data recording and reproducing apparatus 1 according to the present invention includes the head gimbal assembly 12 described above. Therefore, the accurate and high-density data recording and reproduction are achieved, so that the higher product quality is realized.

Second Embodiment

Figure 10:
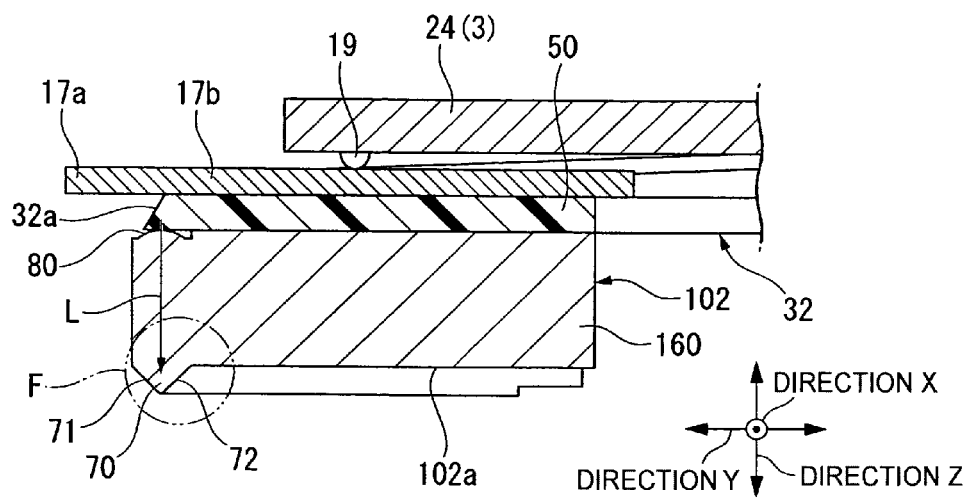
FIG. 10 is a cross-sectional view of gimbal means according to a second embodiment.
Figure 11:
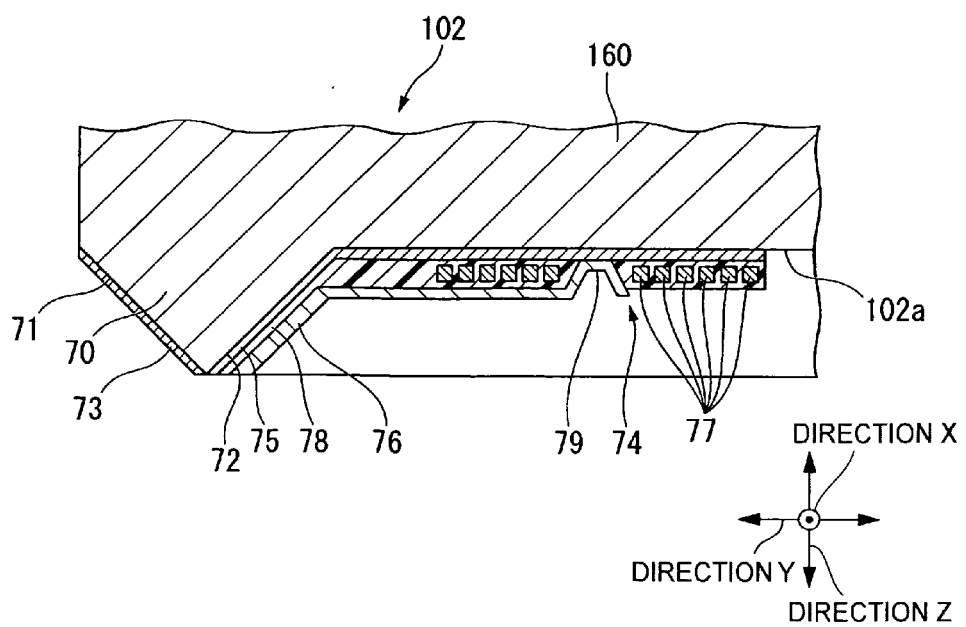
FIG. 11 is an enlarged view of a portion F in FIG. 10.

Referring now to FIGS. 10 and 11, a second embodiment of the present invention will be described. FIG. 10 is a cross-sectional view of gimbal means in the second embodiment, and FIG. 11 is an enlarged view of a portion F in FIG. 10. In the following description, similar configurations to those in the first embodiment are designated by the same reference numerals, and description will be omitted. In this embodiment, the configuration of the slider is different from that in the first embodiment described above.

As shown in FIGS. 10 and 11, a slider 102 in this embodiment includes a slider substrate 160 supported so as to be suspended from a distal end of the suspension 3 via the pad portion 17b in a state in which a floating surface 102a is opposed to the disk D (see FIG. 1). Formed at the distal end (outflow end) of the slider substrate 160 in this embodiment is a polyhedron 70 formed so as to project from the floating surface 102a toward the disk D in the thickness direction (Z direction) and having four side surfaces (for example, side surfaces 71, 72) inclined with respect to an optical axis of the introduced optical flux L.

Formed on the side surface 71 on the side of the distal end surface which constitutes the polyhedron 70 is a reproducing element 73 configured to output electric signals according to the magnitude of the magnetic field leaked out from the disk D. Formed on the side surface 72 on the side of the proximal end which constitutes the polyhedron 70 are a recording element 74 and a coil 77 configured to generate a recording magnetic field between a primary magnetic pole 75 and a secondary magnetic pole 76 which constitute the recording element 74. The recording element 74 includes the primary magnetic pole 75 and the secondary magnetic pole 76 laminated with an insulating film 78 interposed therebetween and, in this embodiment, the primary magnetic pole 75, the insulating film 78, and the secondary magnetic pole 76 are laminated in sequence from the side of the side surface 72.

The primary magnetic pole 75 is formed from the side surface 72 to the floating surface 102a by depositing or the like. The secondary magnetic pole 76 is formed of the same material as the primary magnetic pole 75 and is laminated on the primary magnetic pole 75 with the insulating film 78 interposed therebetween. The primary magnetic pole 75 and the secondary magnetic pole 76 are connected by a magnetic circuit 79. The coil 77 wound into a helical shape about the magnetic circuit 79 is provided around the magnetic circuit 79 in a state of being molded in the insulating film 78.

A lens 80 is formed on the upper surface of the slider 102 at a position right above (Z direction) in the direction of thickness of the polyhedron 70. The lens 80 is an aspheric microlens formed through etching using, for example, a gray scale mask. In addition, the plate portion 50 of the above-described light waveguide 32 is arranged between the upper surface of the slider 102 and the pad portion 17b. Then, the mounting position is adjusted so that the mirror surface 32a of the light waveguide 32 is positioned right above the lens 80.

In this manner, the configuration in the embodiment described above is adapted to be capable of introducing the optical flux L incoming from the laser light source 20 (see FIG. 1) to the light waveguide 32 to the side of the distal end surface (outflow end) and reflecting the same from the mirror surface 32a, and then allowing the same to go out toward the lens 80. This outgoing optical flux L proceeds along the direction of thickness (Z direction) in the interior of the slider substrate 160 while being focused by the lens 80, and is introduced into the polyhedron 70. Then, the focused optical flux L leaks out as a spotlight at a moment when reaching an apex of the polyhedron 70. Therefore, the same effects and advantages as in the first embodiment may be achieved.

Third Embodiment

Figure 12:
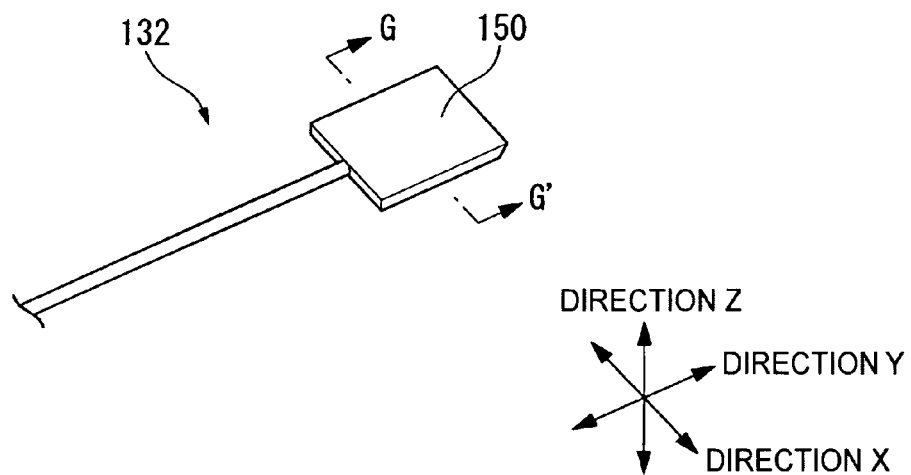
FIG. 12 is a perspective view showing a distal end portion of a light waveguide according to a third embodiment.
Figure 13:
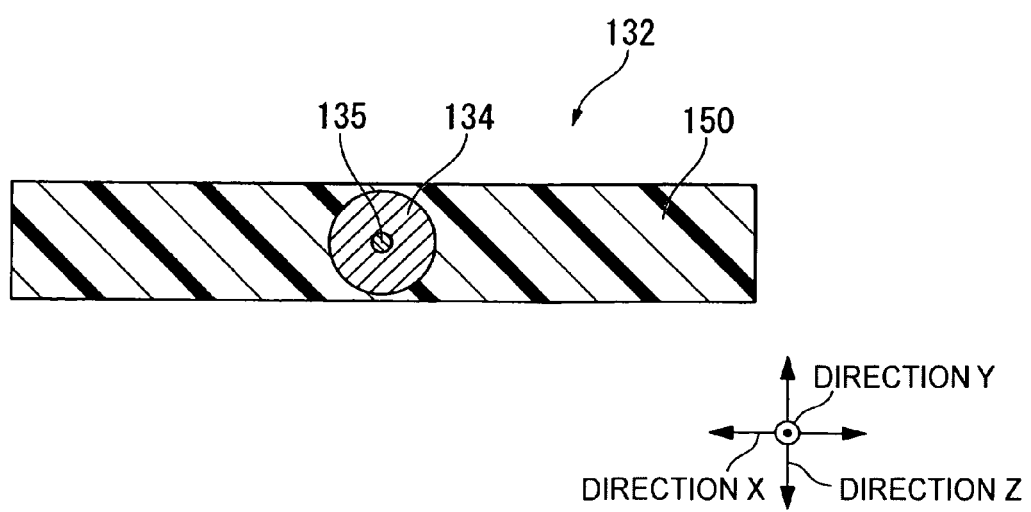
FIG. 13 is a cross-sectional view taken along the line G-G' in FIG. 12.

Referring now to FIGS. 12 and 13, a third embodiment of the present invention will be described. FIG. 12 is a perspective view of a distal end portion of a light waveguide in the third embodiment, and FIG. 13 is a cross-sectional view taken along the line G-G' in FIG. 12. In this embodiment, similar configurations to those in the first embodiment are designated by the same reference numerals, and description will be omitted.

As shown in FIGS. 12 and 13, a light waveguide 132 in this embodiment employs an optical fiber (single mode (SM) fiber) having a core 135 and a clad 134 each having a circular shape in cross section. This light waveguide 132 is formed of the same material as the SSC core 48 and the SSC clad 49 (see FIG. 5) described above, and is provided with a plate portion 150 at a distal end portion thereof.

The plate portion 150 is formed of resin material or metallic material into a rectangular shape in plan view, and is provided so as to cover the clad 134 of the light waveguide 132. The distal end surface of the light waveguide 132 and the distal end surface of the plate portion 150 are flush with each other, and the distal end surface thereof is formed with a mirror surface 132a cut toward the direction intersecting the axial direction (direction of extension) of the light waveguide 132 (for example, approximately 45 degrees). In order to assemble the plate portion 150 and the light waveguide 132, the plate portion 150 is molded first, and then a through hole is formed through the plate portion 150, and the light waveguide 132 is assembled in the through hole. Alternatively, it is also possible to mold the distal end portion of the light waveguide 132 when molding the plate portion 150.

In this manner, according to this embodiment, the plate portion 150, which is a separate member from the light waveguide 132, is provided at a distal end portion of the light waveguide 132 formed of an optical fiber.

In this configuration, since the plate portion 150 is provided on the existing light waveguide 132 in addition to the effects in the first embodiment described above, even though the outline of the slider 2 (see FIG. 3) is different depending on a variety of the sliders 2, the difference of the outline can be accommodated easily only by changing the outline of the plate portion 150. In other words, by forming the plate portion 150 according to the outlines of the respective sliders 2 when assembling the light waveguide 132 to a variety of the sliders 2, the light waveguide 132 can be fixed to the slider 2 irrespective of the shape of the light waveguide 132. Therefore, fixation to slider 2 is achieved easily with reduced number of assembly steps. Also, this configuration requires only the provision of the plate portion 150 on the light waveguide 132, simplification of the structure and reduction of the cost of manufacturing are achieved.

Fourth Embodiment

Figure 14:
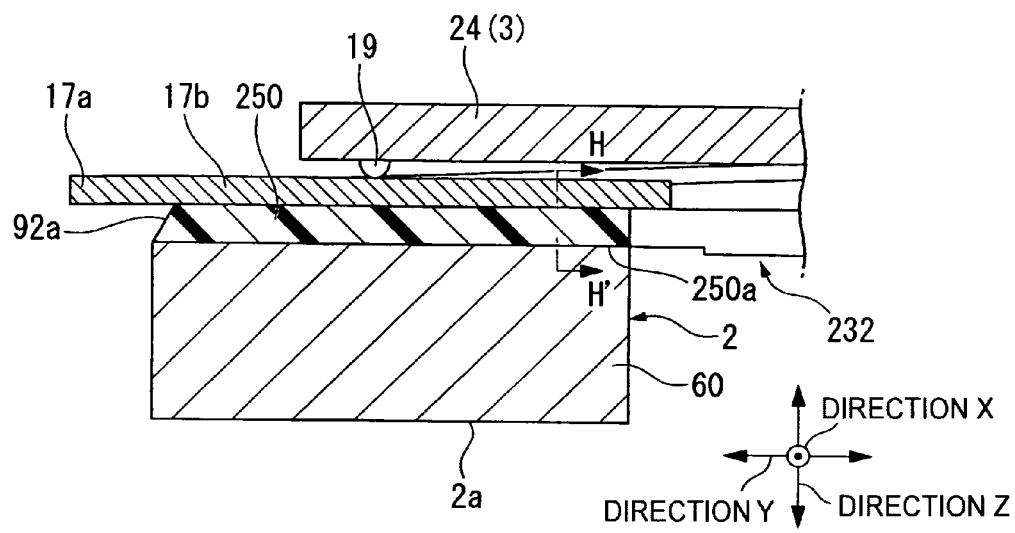
FIG. 14 is a cross-sectional view of the gimbal means according to a fourth embodiment.
Figure 15:
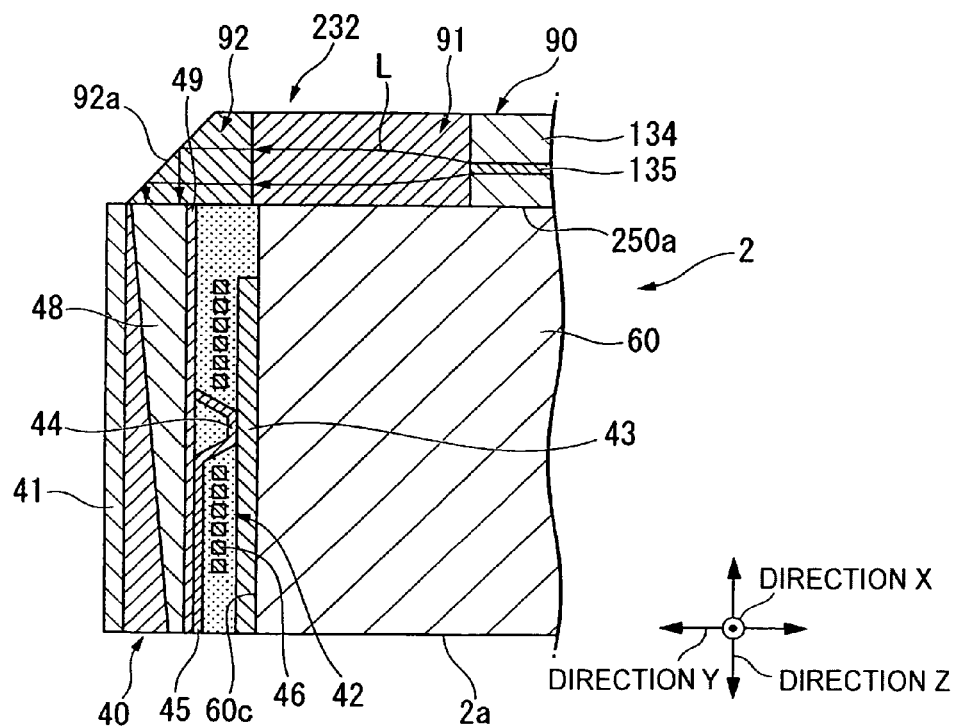
FIG. 15 is an enlarged cross-sectional view of a slider according to the fourth embodiment.
Figure 16:
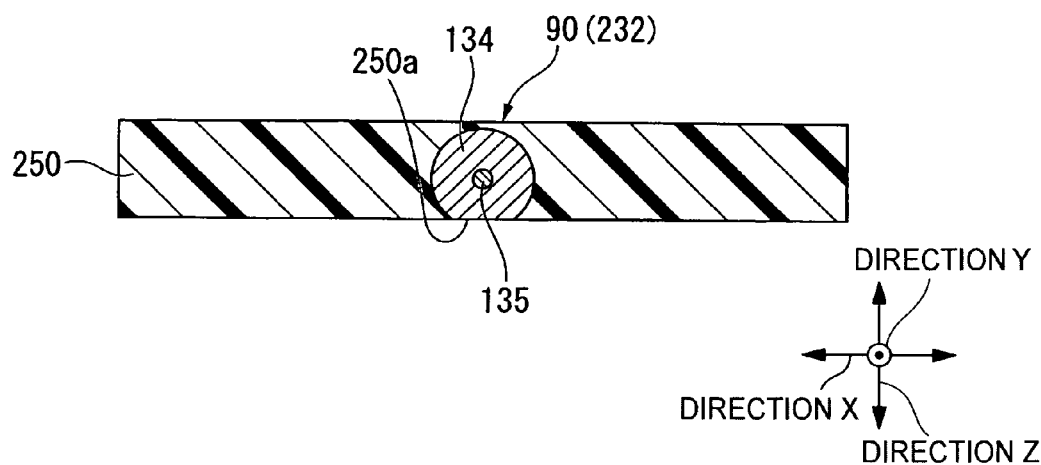
FIG. 16 is a cross-sectional view corresponding to the line G-G' in FIG. 12 according to the fourth embodiment.

Subsequently, a fourth embodiment of the present invention will be described. FIG. 14 is a cross-sectional view of a gimbal means in the fourth embodiment, and FIG. 15 is an enlarged cross-sectional view of a slider. FIG. 16 is a cross-section corresponding to the line H-H' in FIG. 14.

As shown in FIGS. 14 and 15, a light waveguide 232 in this embodiment is the light waveguide 232 employing an optical fiber as in the third embodiment described above, and includes a single mode fiber (hereinafter, referred to as SM fiber) 90, a graded index fiber (hereinafter, referred to as GI fiber) 91 connected to the distal side of the SM fiber 90, and a no-clad fiber 92 connected to the distal side of the GI fiber 91 (see FIG. 15).

The SM fiber 90 is formed of the same material as in the third embodiment, and includes the core 135 and the clad 134.

The GI fiber 91 is an optical fiber having an index of refraction at the center thereof larger than that of the outer periphery thereof in the field where the optical flux L is propagated, so that the index of refraction is continuously lowered radially outward from the center. Accordingly, the optical flux L propagates in the GI fiber 91 along the sinusoidal optical path. In other words, the output angle of the optical flux L outgoing from the GI fiber 91 can be adjusted by adjusting the length of the GI fiber 91. In this embodiment, the length of the GI fiber 91 is set so that the optical flux L outgoing from the core 135 of the SM fiber 90 goes out in the form of a collimated light via the GI fiber 91. It is also possible to employ a polarization-preserving fiber configured to preserve a vibration surface of the optical flux L in the constant direction instead of the GI fiber 91 and the SM fiber 90. The polarization-preserving fiber is a member having a stress applying member configured to apply a stress on the core from both sides of the core in the clad, thereby allowing only a linear polarization in a specific direction to flow in the core.

The no-clad fiber 92 is formed only of the same material as the core 135 which constitutes the above-described SM fiber 90, and is configured to propagate the optical flux L outgoing from the GI fiber 91 through the entire cross-section orthogonal to the longitudinal direction. Accordingly, the collimated light outgoing from the GI fiber 91 is propagated toward the outflow end of the no-clad fiber 92 in a parallel state. Then, the distal end surface of the no-clad fiber 92 is cut toward the direction interesting the axial direction (direction of extension) of the no-clad fiber 92 (for example, 45 degrees). Then, the cross section constitutes a mirror surface 92a for reflecting the optical flux L propagated in the no-clad fiber 92 in the direction different from the direction of introduction. The mirror surface 92a reflects the optical flux L propagated in the no-clad fiber 92 so as to change the direction of the optical flux L by substantially 90 degrees, and is configured to direct the collimated light toward the spot light converter 40. The mirror surface 92a may be configured to be formed by forming a reflecting panel of aluminum or the like through an evaporation method or the like.

Here, as shown in FIGS. 14 and 16, a plate portion 250 is provided at a distal end portion of the light waveguide 232, that is, between the slider 2 and the pad portion 17b so as to cover the light waveguide 232. Then, the side of the plate portion 250 bonded with the slider substrate 60 (the lower surface) is formed with a flat surface 250a which is an outer peripheral surface of the clad 34 of the SM fiber 90 exposed in a planar shape. The flat surface 250a is formed by grinding the surface of the plate portion 250 bonded to the slider substrate 60 until a position where the clad 134 is exposed in the thickness direction, and the flat surface 250a is formed from the proximal side of the slider 2 to the distal end surface, that is, to the GI fiber 91 and the no-clad fiber 92. Then, the flat surface 250a is bonded to the bonding surface of the slider substrate 60, whereby the slider 2 and the light waveguide 232 are fixed. Then, the optical flux L (collimated light) reflected from the mirror surface 92a of the no-clad fiber 92 passes through a boundary between the flat surface 250a and the spot size converter 40 without being refracted. In other words, the optical flux L passing vertically through the boundary between the flat surface 250a and the spot size converter 40 proceeds straight ahead through the boundary and enters the spot size converter 40.

Therefore, according to this embodiment, since the same effects as in the third embodiment are achieved and, in addition, the GI fiber 91 is employed in the light waveguide 232, the output angle of the optical flux L can be set feely by adjusting the length of the GI fiber 91.

In addition, since the no-clad fiber 92 is connected to the distal end of the GI fiber 91, the optical flux L is propagated through the entire portion in the no-clad fiber 92, so that the optical path can be elongated while maintaining the input angle from the GI fiber 91. Therefore, the optical path adjustment of the light waveguide 232 is facilitated. In other words, the optical flux L entering the spot size converter 40 can be optimized by setting the length of the GI fiber 91.

Furthermore, by forming the flat surface 250a, which is the outer peripheral surface of the clad 34 (light waveguide 232) exposed in a planer shape, the interface between the mirror surface 92a and the spot size converter 40 is formed into a flat surface. Accordingly, when the collimated light passes through the flat surface 250a, it proceeds straight ahead without being refracted.

Therefore, the spot shape of the incident light to the slider 2 can be optimized by adjusting the output angle of the optical flux L, so that the spotlight can be generated efficiently by the spot size converter 40.

Fifth Embodiment

Figure 17:
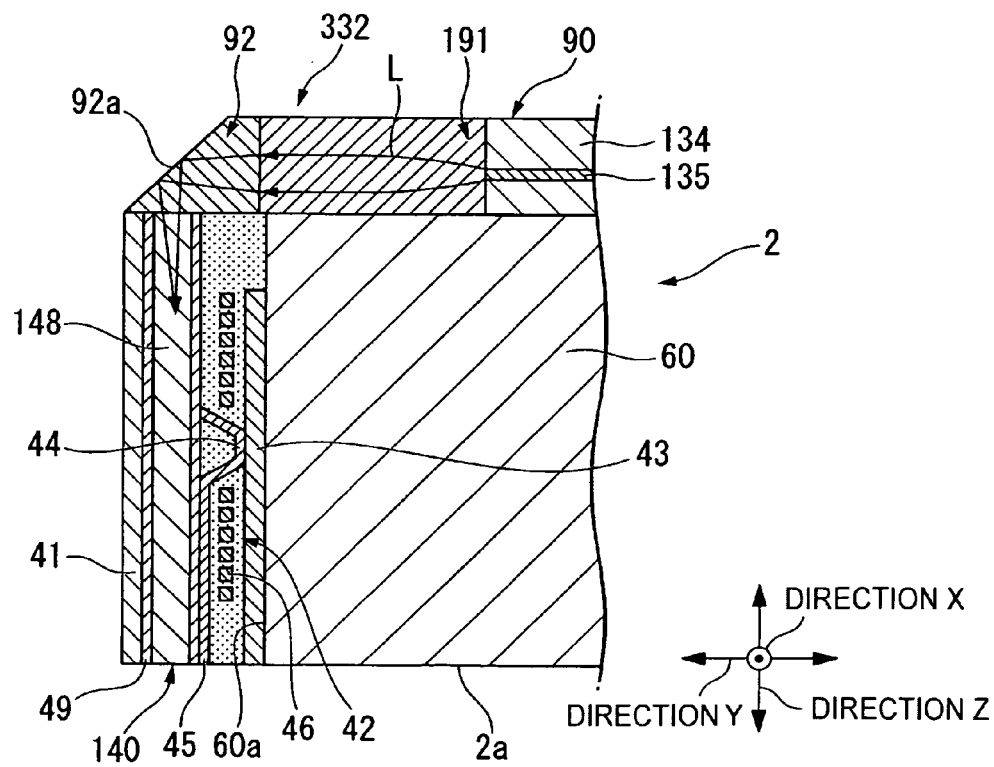
FIG. 17 is an enlarged cross-sectional view of a slider according to a fifth embodiment.

Subsequently, a fifth embodiment of the present invention will be described. FIG. 17 is a cross-sectional view of a slider in the fifth embodiment. In the following description, similar configurations to those in the fourth embodiment are designated by the same reference numerals, and description will be omitted.

As shown in FIG. 17, according to a light waveguide 332 in this embodiment, the length of a GI fiber 191 is set to be longer than the GI fiber 91 (see FIG. 15) in the fourth embodiment. In other words, the length of the GI fiber 191 is set so as to focus the optical flux L outgoing from the distal end of the GI fiber 191 to the no-clad fiber 92. More specifically, a focal point is set after the reflection from the mirror surface 92a and in a waveguide core 148 of a head waveguide (spotlight generating element) 140. In this case, it is not necessary to provide a lens or the SSC core 48 for focusing the optical flux L in the slider 2. In other words, the waveguide core 148 of the head waveguide 140 is different from the SSC core 48 in the first embodiment in that the cross-sectional area orthogonal to the longitudinal direction (Z direction) is the same in the direction from the proximal side to the distal side.

Therefore, according to this embodiment, since the same effects as in the fourth embodiment are achieved and, in addition, the length of the GI fiber 191 is set so as to focus the optical flux L, the SSC core 48 is no longer necessary and hence reduction of the cost of manufacturing is achieved.

Sixth Embodiment

Figure 18:
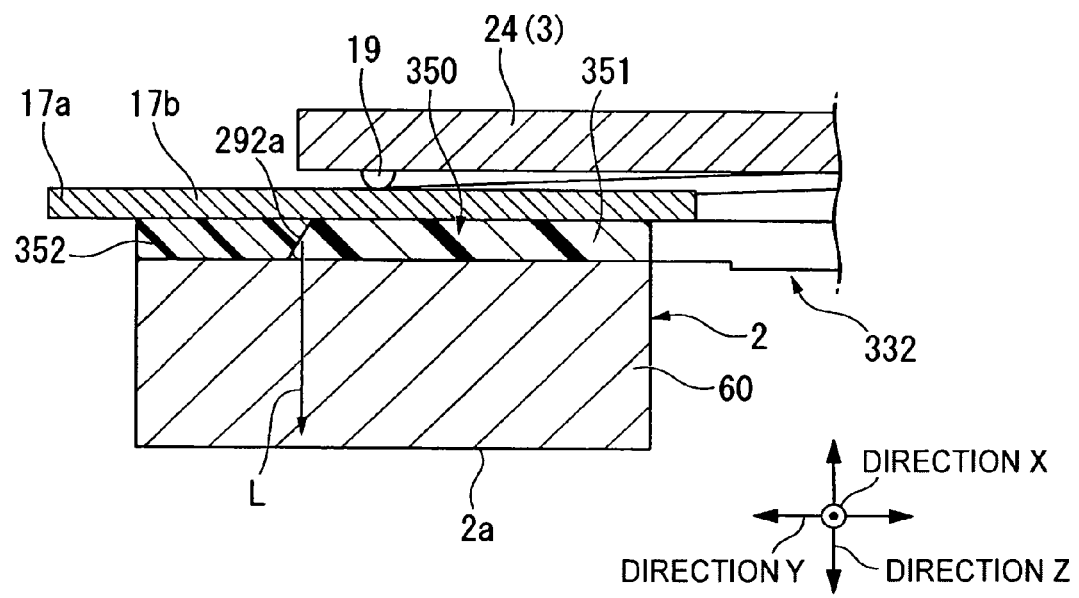
FIG. 18 is a cross-sectional view of the gimbal means according to a sixth embodiment.
Figure 19:
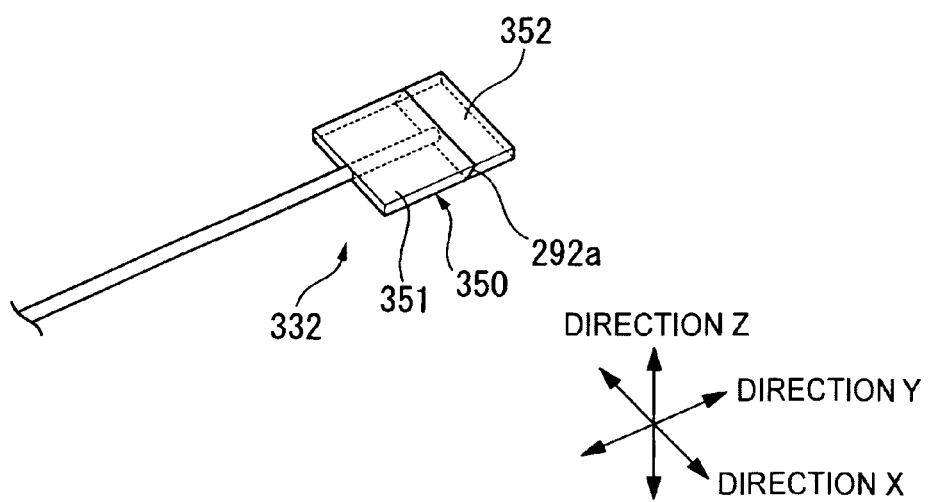
FIG. 19 is a perspective view showing a distal end portion of a light waveguide according to the sixth embodiment.

Subsequently, a sixth embodiment of the present invention will be described. FIG. 18 is a cross-sectional view of gimbal means in the sixth embodiment, and FIG. 19 is a perspective view showing a distal end portion of a light waveguide according to the sixth embodiment. In the following description, similar configurations to those in the fifth embodiment are designated by the same reference numerals, and description will be omitted.

As shown in FIGS. 18 and 19, in this embodiment, a spot size converter (not shown) is arranged at a midsection in the longitudinal direction of the slider 2.

In this case, a plate portion 350 formed at the distal end portion of the light waveguide 332 includes a first plate portion 351, and a second plate portion 352 arranged at the distal end surface of the first plate portion 351. The first plate portion 351 is arranged in an area from the proximal end surface to the midsection of the slider 2 between the slider 2 and the pad portion 17b, and the distal end surface is cut toward the direction intersecting the axial direction (direction of extension) of the light waveguide 332 (for example, 45 degrees) and constitutes a mirror surface 292a. In other words, the mirror surface 292a of the light waveguide 332 is formed so as to be positioned right above the spot size converter. The mirror surface 292a is formed with a film of a metallic material having a high reflectance such as aluminum through the evaporation method or the like.

In contrast, the second plate portion 352 is configured by filling the same material as the first plate portion 351 between the slider 2 and the pad portion 17b on the distal side of the first plate portion 351, that is, on the distal side of the mirror surface 292a. By forming the second plate portion with the metallic material having a high reflectance, the interface with respect to the first plate portion may be formed into a mirror surface.

In this manner, according to this embodiment, even when the spot size converter is present at the midsection of the slider 2, no gap is formed between the slider 2 and the pad portion 17b on the distal side of the light waveguide 332. Therefore, the same effects as in the fourth embodiment is achieved and, even when the spot size converter is not arranged on the side of the distal end surface of the slider 2, the light waveguide 332 can be introduced easily corresponding to the position of arrangement of the spot size converter.

Seventh Embodiment

Figure 20:
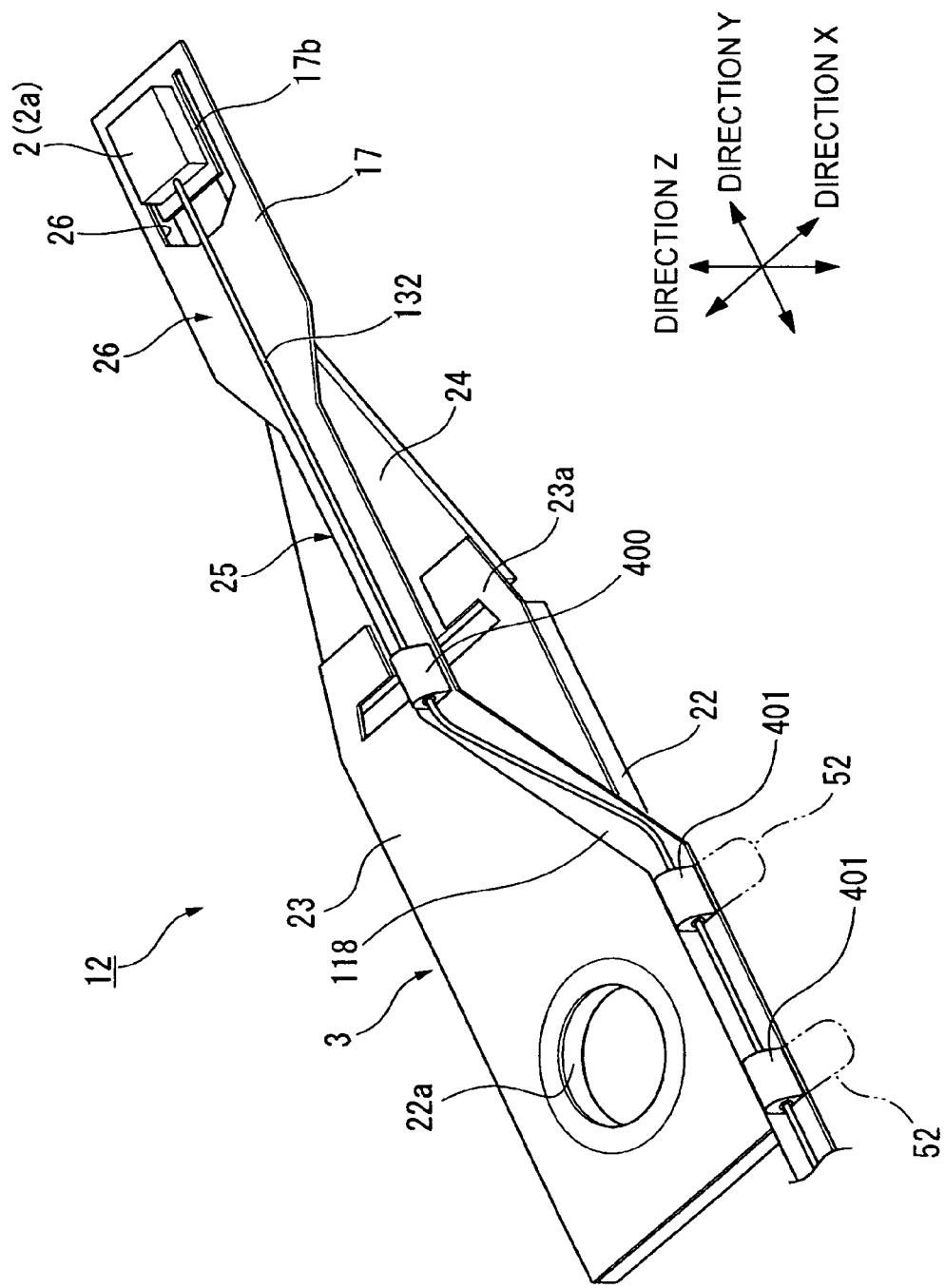
FIG. 20 is a perspective view of a head gimbal assembly according to a seventh embodiment.

Subsequently, a seventh embodiment of the present invention will be described. FIG. 20 is a perspective view of a head gimbal assembly according to the seventh embodiment. In the following description, similar configurations to those in the first embodiment are designated by the same reference numerals, and description will be omitted.

As shown in FIG. 20, a plurality of supporting members 400, 401 for supporting the light waveguide 132 are provided on a supporting body 118 of the flexure 25. The supporting members 400, 401 are members each having a through hole to allow the insertion of the light waveguide 132, and configured to support the light waveguide 132 so as to be movable in the longitudinal direction according to the movement of the slider 2.

The supporting members 401 from among the plurality of supporting members 400, 401 each are formed by bending a tongue portion 52 formed in the direction orthogonal to the direction along the longitudinal direction of the supporting body 118 so as to surround the periphery of the light waveguide 132.

In this embodiment, the light waveguide 32 can be moved along the longitudinal direction in association with the variations in position of the slider 2 and the load beam 24 when the data recording and reproducing apparatus 1 is in operation. Therefore, a force from the light waveguide 32 does not act on the slider 2 when floating (in operation), and the slider 2 can be floated stably. Also, when a force is applied to the light waveguide 132 in the twisting direction about the axial direction thereof, the light waveguide 132 is constrained by the supporting members 400, 401 only in the direction at a right angle with respect to the axial direction by the supporting members 400, 401, so that the force from the light waveguide 32 does not act on the slider 2. Since the light waveguide 132 can be supported only by forming the tongue portions 52 on the supporting body 118 of the flexure 25 and bending the tongue portions 52, the light waveguide 132 can be supported reliably in a simple structure.

Eighth Embodiment

Figure 21:
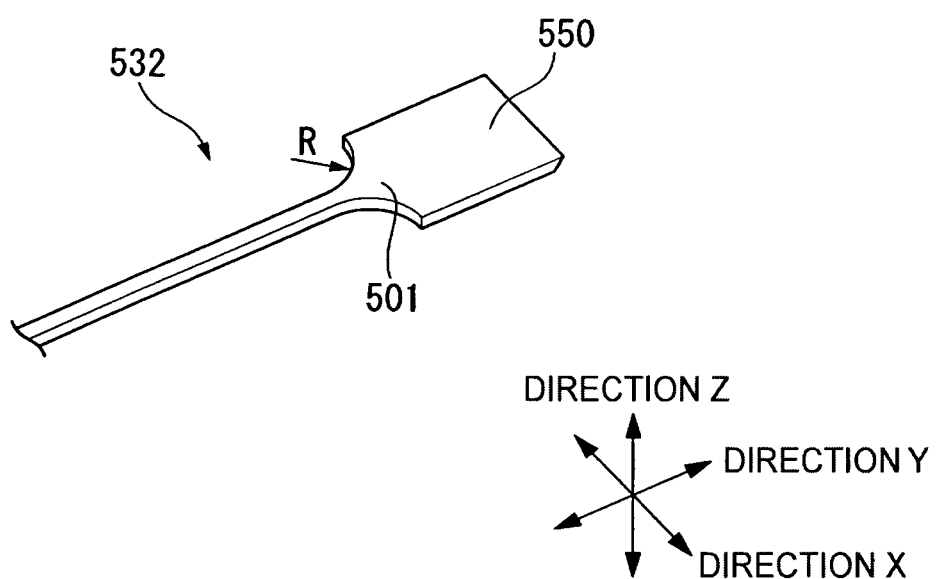
FIG. 21 is a perspective view showing a distal end portion (plate portion) of a light waveguide according to an eighth embodiment.

Subsequently, an eighth embodiment of the present invention will be described. FIG. 21 is a perspective view showing a distal end portion (plate portion) of a light waveguide according to the eighth embodiment. In the following description, similar configurations to those in the first embodiment are designated by the same reference numerals, and description will be omitted.

As shown in FIG. 21, a light waveguide 532 in this embodiment is formed integrally with a plate portion 550 in the same manner as the first embodiment described above. At the proximal side of the plate portion 550, that is, at a connecting portion 501 between the light waveguide 532 and the plate portion 550, the plate portion 550 is formed to have a cross section being reduced as it goes toward the proximal side. More specifically, the connecting portion 501 of the plate portion 550 is formed to be reduced gradually in widthwise (X direction) length as it goes toward the proximal side. Then, the side surface of the connecting portion 501 has a curved surface having a predetermined radius of curvature R.

In this configuration, with the connecting portion 501 between the plate portion 550 and the light waveguide 532 formed to get gradually smaller in cross section, the stress acting on the connecting portion 501 can be dispersed. Accordingly, the connecting portion 501 is prevented from braking down by variations in position of the slider 2 when in use or concentration of the stress to the connecting portion 501 at the time of manufacture.

The shape of the connecting portion 501 can be changed in design as needed such as a tapered shape reducing in thickness linearly toward the proximal side for example. In this embodiment, the connecting portion 501 is gradually reduced in widthwise (X direction) length as it goes toward the proximal side. However it may be formed so as to be gradually reduced in length in the heightwise direction (Z direction) or to be gradually reduced both in widthwise and heightwise directions. Furthermore, the case in which the light waveguide 532 and the plate portion 550 are integrally formed has been described in the eighth embodiment. However, the invention is not limited thereto, and the configuration in which the light waveguide 132 and the plate portion 150 are provided separately as in the third embodiment described above may also be applied.

Ninth Embodiment

Figure 22:
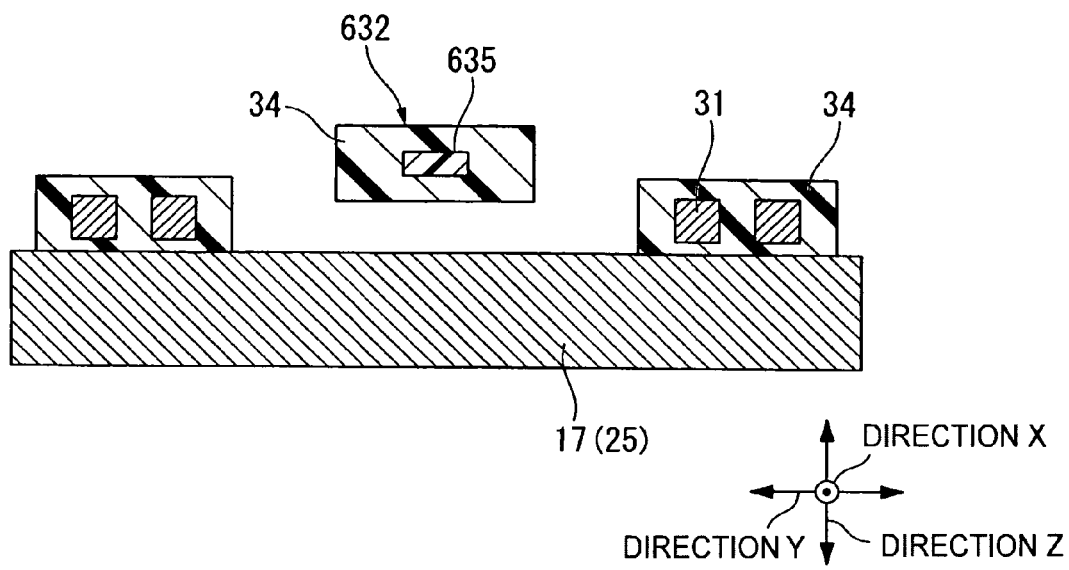
FIG. 22 is a cross-sectional view corresponding to FIG. 7 showing a ninth embodiment of the present invention.

Subsequently, a ninth embodiment of the present invention will be described. FIG. 22 is a cross-sectional view corresponding to FIG. 7 showing the ninth embodiment of the present invention. In the following description, similar configurations to those in the first embodiment are designated by the same reference numerals, and description will be omitted.

As shown in FIG. 22, a light waveguide 632 in this embodiment is different from the first embodiment in that the cross section (YZ plane) orthogonal to the direction of extension of a core 635 is formed into a rectangular shape. More specifically, the core 635 is set to in such a manner that the lengths of a long side and a short side are different in YZ plane, and is formed in a state in which the direction of the long side is matched with the Y direction and the direction of the short side is matched with the Z direction. In this case, if the length of the long side of the core 635 exceeds one time of the short side, the effect of the present invention is achieved as a matter of course, and is more preferably at least 1.1 times (that is, the aspect ratio is 1.1:1 or higher).

In this manner by differentiating the lengths of the long side and the short side of the core 635 in the YZ plane, the vibrating surface of the optical flux L can be maintained in the constant direction, so that the optical flux L can be guided to the slider 2 in a state of maintaining the linear polarization (preservation of single polarization). In this case, the core 635 in this embodiment can be manufactured using the same manufacturing method as the method of manufacturing the core 35 having a square cross section as in the respective embodiments described above. In other words, what is required when manufacturing the light waveguide 632 and the electric line 31 using the semiconductor process at once is just to change the film thickness of the core 635 as needed, increase of the manufacturing cost and lowering of the efficiency of manufacturing can be prevented.

Figure 23:
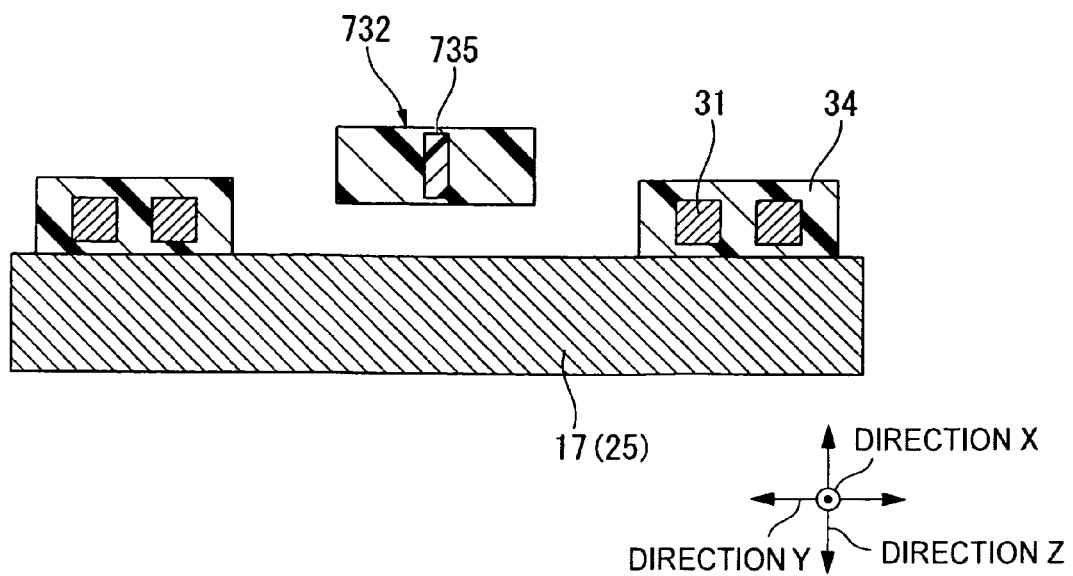
FIG. 23 is a cross-sectional view corresponding to FIG. 7 showing another embodiment of the present invention.

As shown in FIG. 23, a light waveguide 732 which brings the long side of a core 735 to be matched with the Z direction and the short side to be matched with the Y direction in the YZ plane may be employed. In this configuration as well, the same effects as described above are achieved. Although not shown in the drawing, the cross-sectional shape of the core is not limited to the rectangular shape, and may be changed in design as needed as long as it is a flat shape such as an oval shape. In this case as well, what is required is just to set the length of the long axis of the core to one or more times of the short axis or, more preferably, to set the ratio of the long axis and the short axis to 1:1.1 or higher. In other words, the core must be formed only to have different lengths in two directions (Y direction, Z direction) orthogonal to the direction of extension (X direction).

Tenth Embodiment

Figure 24:
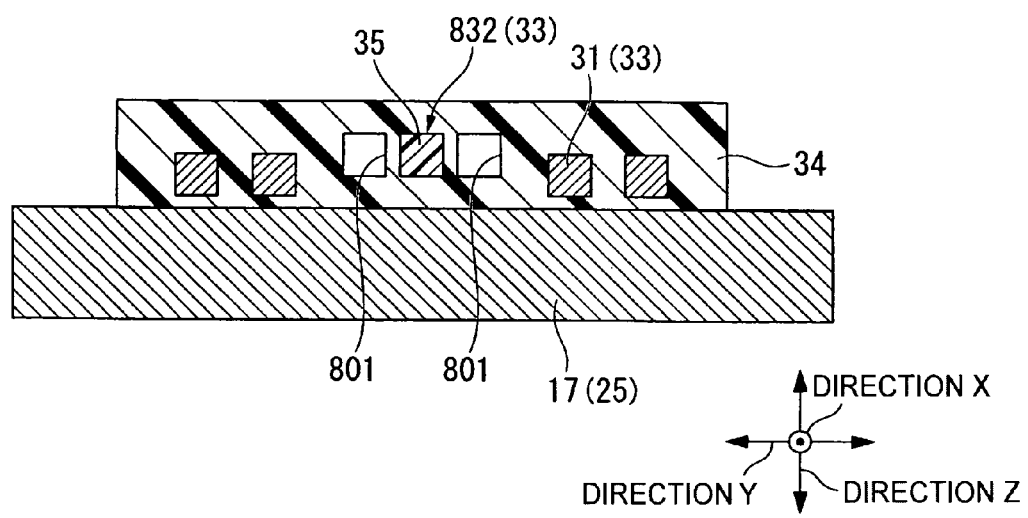
FIG. 24 is a cross-sectional view corresponding to the line I-I' in FIG. 3 showing a tenth embodiment of the present invention.

Subsequently, a tenth embodiment of the present invention will be described. FIG. 24 is a cross-sectional view corresponding to the line I-I' in FIG. 3 showing the tenth embodiment of the present invention. In the following description, similar configurations to those in the first embodiment are designated by the same reference numerals, and description will be omitted.

As shown in FIG. 24, a light waveguide 832 in this embodiment is formed with a pair of tunnel portions 801 are formed on both sides of the core 35 of the clad 34 in the Y direction. The tunnel portions 801 are spaces arranged so as to sandwich the core 35 from the both sides, and extend in parallel to the direction of extension of the core 35. In other words, the tunnel portions 801 are spaces formed in the clad 34, having a cross section (YZ plane) taken orthogonally to the direction of extension of a rectangular shape in plan view, and being filled with air or other suitable gases in the interior thereof. The interiors of the tunnel portions 801 may be held in a vacuumed state. In other words, the index of refraction of the tunnel portions 801 is approximately 1.

Therefore, according to this embodiment, the same effects as in the first embodiment are achieved, and the vibrating surface of the optical flux L can be maintained in the constant direction (preservation of single polarization) by arranging the tunnel portions 801 on both sides of the core 35. Therefore, only the linear polarization in a specific direction is allowed to pass through the core 35, and hence optimization of the spot shape of the incident light to the slider 2 is achieved, and generation of the spotlight in the spot size converter 40 with high degree of efficiency is also achieved.

The cross-sectional shape of the tunnel portions 801 is not limited to the rectangular shape, and various shapes as circle may be employed. The number of the tunnel portions 801 may be plural, two or more. Furthermore, the layout of the tunnel portions 801 may be modified as needed such as the arrangement in a pair on both sides of the core 35 in the X direction, or the arrangement around the periphery of the core 35.

Eleventh Embodiment

Figure 25:
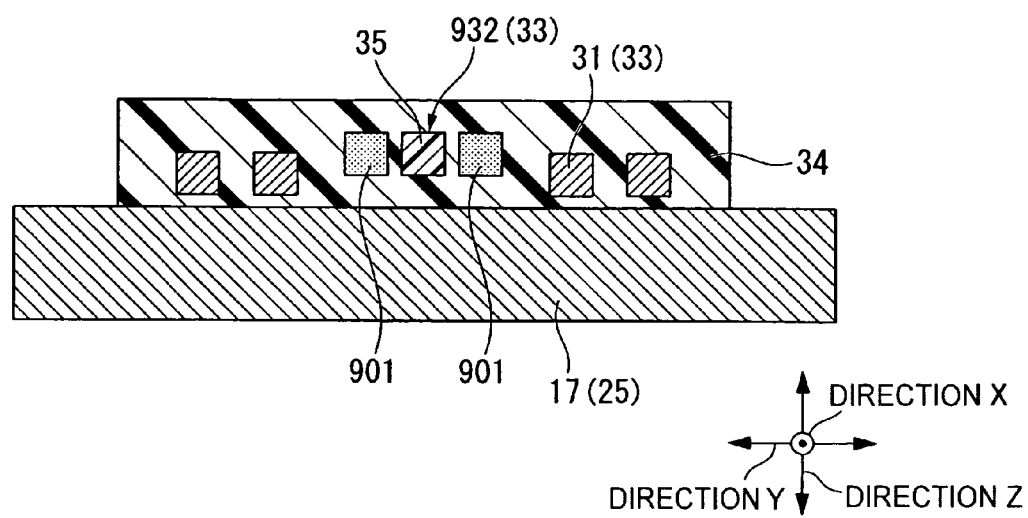
FIG. 25 is a cross-sectional view corresponding to the line I-I' in FIG. 3 showing an eleventh embodiment of the present invention.

Subsequently, an eleventh embodiment of the present invention will be described. FIG. 25 is a cross-sectional view corresponding to the line I-I' in FIG. 3 showing the eleventh embodiment of the present invention. In the following description, similar configurations to those in the first embodiment are designated by the same reference numerals, and description will be omitted.

Figure 26:
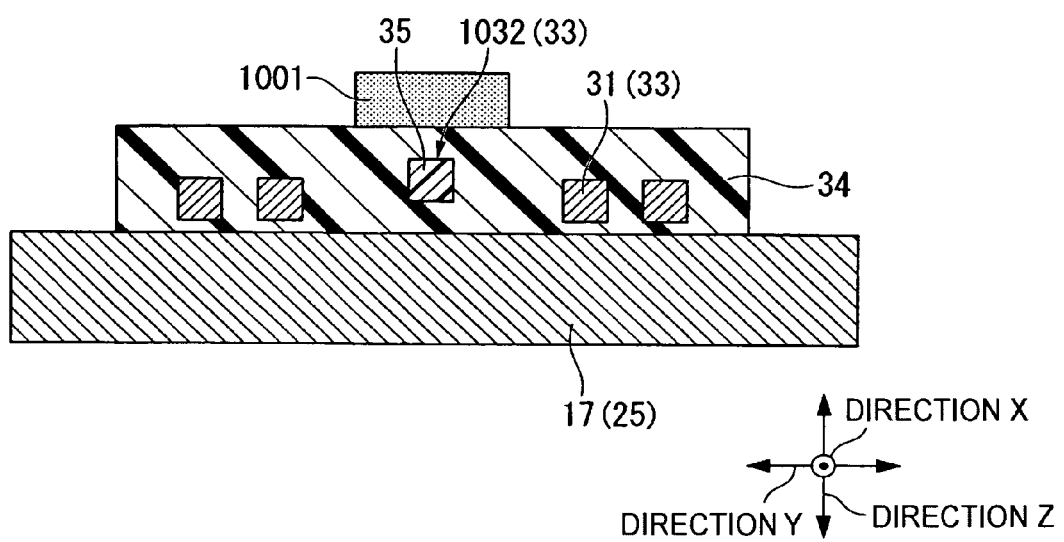
FIG. 26 is a cross-sectional view corresponding to the line I-I' in FIG. 3 showing another embodiment of the present invention.

As shown in FIG. 26, a light waveguide 932 in this embodiment is formed with a pair of stress applying portions 901 on both sides of the core 35 of the clad 34 in the Y direction. The stress applying portions 901 are rectangular-shaped portions in cross section arranged so as to sandwich the core 35 from the both sides, and extend in parallel to the direction of extension of the core 35.

The materials that can be employed for the stress applying portions 901 are materials which are different in coefficient of linear expansion from the material which constitutes the light waveguide 932, for example, metals such as aluminum or nickel, or synthetic resins such as liquid crystal polymer. In this case, a compression stress acts in the direction orthogonal to the direction of extension of the core 35 by a relative thermal expansion and thermal contraction between the stress applying portions 901 and the clad 34.

Therefore, according to this embodiment, the compression stress is applied to the core 35 equally from both sides by arranging the stress applying portions 901 on both sides of the core 35 in the Y direction as in the second embodiment described above. Since the compression stress generates a birefringence in the core 35, and the vibrating surface of the optical flux L can be maintained in the constant direction, so that the optical flux L can be guided to the slider 2 in a state in which the linear polarization is maintained.

As a method of manufacturing the stress applying portions 901, a following method may be employed in addition to the method described above. In other words, by using silica glass as a material for forming the clad 34 and irradiating the areas of the clad 34 where the stress applying portions 901 are formed with an ion beam, only the irradiated areas locally becomes high in density. Accordingly, the areas irradiated with the ion beam becomes the stress applying portions 901, and the compression stress acts toward the core 35 from the stress applying portions 901. In this case, since the compression stress does not change with the change in temperature, the highly reliable stress applying portions 901 without dependency on the temperature are formed.

In the same manner as the tunnel portions 801 in the second embodiment, the cross-sectional shape of the stress applying portions 901 is not limited to the rectangular shape, and various shapes as circle may be employed. The number of the stress applying portions 901 may be plural, two or more. Furthermore, the layout of the stress applying portions 901 may be modified as needed such as the arrangement in a pair on both sides of the core 35 in the X direction, or the arrangement around the periphery of the core 35.

As a configuration of the stress applying portion, a configuration shown below may be employed in addition to the configuration described above. For example, as shown in FIG. 26, a light waveguide 1032 includes a stress applying portion 1001 arranged on the surface of the clad 34 (the surface opposing the disk surface D1). The stress applying portion 1001 is formed of the same material as the stress applying portions 901 described above, and is arranged right above the core 35. In this case, a stress is applied from the stress applying portion 1001 in the direction of compressing the core 35 from above the core 35. Accordingly, the same effects as the third embodiment described above are achieved. In this configuration, since the configuration is as simple as arranging the stress applying portion 1001 on the clad 34, increase in efficiency of manufacturing can be prevented.

Twelfth Embodiment

Figure 27:
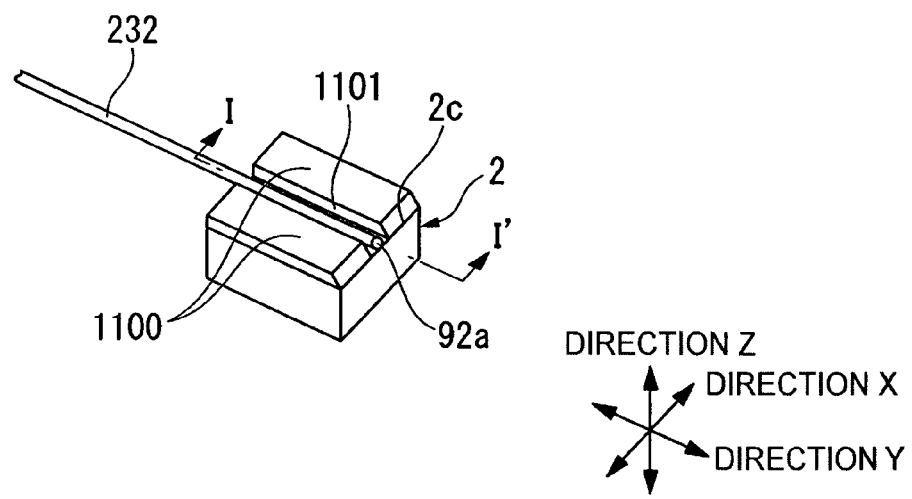
FIG. 27 is an enlarged perspective view showing a distal end portion of a head gimbal assembly according to a twelfth embodiment of the present invention.
Figure 28:
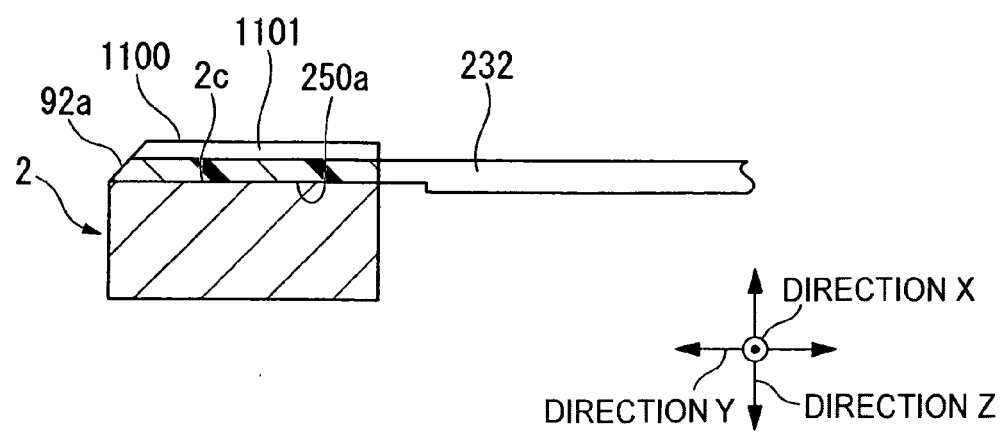
FIG. 28 is a cross-sectional view taken along the line I-I' in FIG. 27.

Subsequently, a twelfth embodiment of the present invention will be described. FIG. 27 is an enlarged perspective view showing a distal end portion of a head gimbal assembly according to the twelfth embodiment of the present invention, and FIG. 28 is a cross-sectional view taken along the line I-I' in FIG. 27. In the following description, similar configurations to those in the first embodiment are designated by the same reference numerals, and description will be omitted. This embodiment is different from the respective embodiment shown above in that the positioning portion and the light waveguide in the present invention are separately provided.

As shown in FIGS. 27 and 28, a positioning portion 1100 in this embodiment is arranged on a back surface 2c of the slider 2 (the surface of the slider 2 opposing the pad portion 17b (see FIG. 8)). More specifically, a pair of the positioning portions 1100 are provided on both sides of the slider 2 in the X direction, and each are a plate-shaped member having a flat surface formed along the Y direction. The pair of positioning portions 1100 each have a proximal end surface and both side surfaces flush with the proximal end surface and both side surfaces of the slider 2, respectively. On the other hand, the distal end surface of the positioning portion 1100 is cut toward the direction intersecting the axial direction (direction of extension) of the light waveguide 232 (for example, approximately 45 degrees). In other words, the distal end surface of the positioning portion 1100 is formed to be flush with the distal end surface of the light waveguide 232 (mirror surface 92*a*).

Formed inside the pair of positioning portions 1100 (between the respective positioning portions 1100) is a guide groove 1101 extending from the distal end surface to the proximal end surface of the slider 2 along the Y direction at a center portion of the slider 2 in the X direction. In this guide groove 1101, the light waveguide 232 described above is arranged so as to be sandwiched between the positioning portions 1100. Specifically, the light waveguide 232 is an optical fiber having the flat surface 250*a* on the side of the surface bonded to the slider 2 as in the fourth embodiment, for example, and is fixedly bonded to the back surface 2*c* of the slider 2 in a state in which the direction of extension of the guide groove 1101 is matched with the direction of extension of the light waveguide 232 at a widthwise (X direction) center portion of the guide groove 1101. The width of the guide groove 1101 is not limited as long as it is set to be the same or larger than the diameter of the light waveguide 232. However, a relatively narrow width facilitates the positioning, and allows the light waveguide 232 to be arranged in the guide groove 1101 without deviation.

In this embodiment, in order to fix the light waveguide 232 to the slider 2, first of all, the positioning portions 1100 are fixedly bonded to the slider 2 in a state in which the end surface of the slider 2 and the end surfaces of the positioning portions 1100 are positioned on both sides of the back surface 2*c* of the slider 2. Then, the light waveguide 232 and the slider 2 are fixedly bonded in a state in which the light waveguide 232 is arranged in the guide groove 1101 formed between the positioning portions 1100, and the mirror surface 92*a* of the light waveguide 232 and the distal end surface of the positioning portion 1100 are positioned. Accordingly, the light waveguide 232 can be positioned and fixed to the slider 2.

In this embodiment, the same effects as in the embodiments described above are achieved and, in addition, by arranging the positioning portions 1100 on the back surface 2*c* of the slider 2, the light waveguide 232 can be fixed to the slider 2 only by arranging the light waveguide 232 in the guide groove 1101 formed between the positioning portions 1100. Therefore, positioning or fixation between the light waveguide 232 and the slider 2 are facilitated. In addition, by configuring the positioning portions 1100 and the light waveguide 232 as separate members, the various types of light waveguides 232 can be fixed according to the application, so that the design flexibility is improved.

The case where the optical fiber in the third embodiment is employed, for example, as the light waveguide has been described in the embodiment described above. However, the invention is not limited thereto, and various optical fibers described above may be employed.

Figure 29:
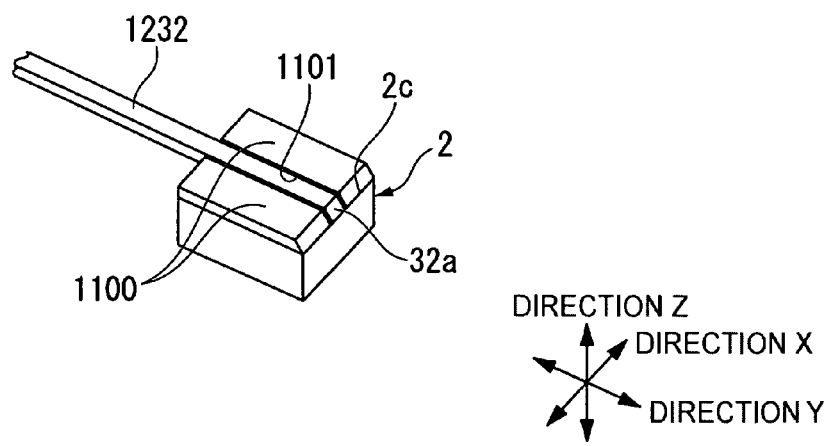
FIG. 29 is an enlarged perspective view showing a distal end portion of a head gimbal assembly according to another embodiment of the present invention.

As shown in FIG. 29, it is also possible to employ a resin waveguide 1232 having a rectangular shape in cross section including the core 35 and the clad 34 that comes into tight contact with the core 35 and seals the core 35 (see FIG. 7 for both) as in the first embodiment. In this case, the thickness (thickness in Z direction) of the resin waveguide 1232 is needed to be the same as or thinner than the positioning portion 1100.

Thirteenth Embodiment

Figure 30:
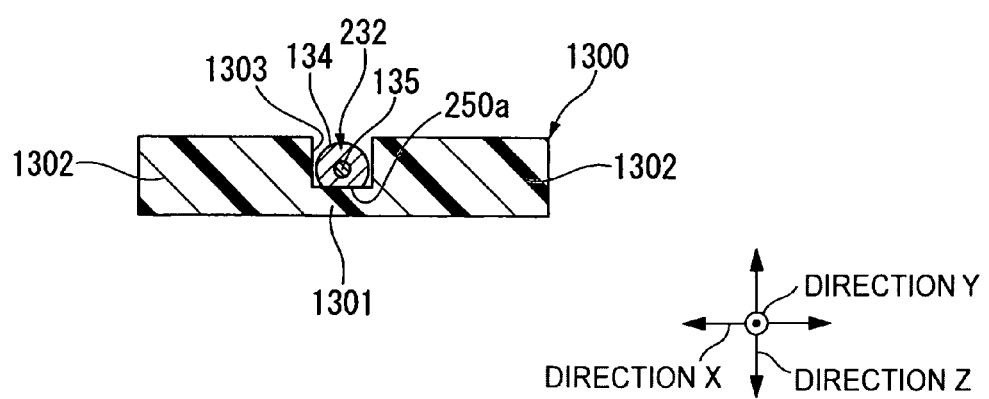
FIG. 30 is a cross-sectional view corresponding to the line H-H' in FIG. 14 showing a thirteenth embodiment of the present invention.

Subsequently, a thirteenth embodiment of the present invention will be described. FIG. 30 is a cross-sectional view corresponding to the line H-H' in FIG. 14 showing the thirteenth embodiment of the present invention. In the following description, similar configurations to those in the first embodiment are designated by the same reference numerals, and description will be omitted. In the twelfth embodiment described above, the case where the positioning portion in the present invention is arranged on the back surface 2*c* of the slider 2 as the pair of the positioning portions 1100 has been described. However, the invention is not limited thereto, and the positioning portions on the both side may be connected at least partly.

Specifically, as shown in FIG. 30, a positioning portion 1300 includes a thin plate portion 1301 having the same outline as the back surface 2*c* (see FIG. 28) of the slider 2, and protruding portions 1302 protruding in the Z direction are formed on both sides of the thin plate portion 1301 in the X direction. In other words, the positioning portion 1300 in this embodiment is formed into a C-shape in cross section, and the grove formed between the protruding portions 1302 functions as a guide groove 1303 of the light waveguide 232. Then, the light waveguide 232 is fixedly bonded to the bottom portion of the guide groove 1303.

Although the thin plate portion 1301 is provided on the side of the slider 2 of the positioning portion 1300 (the lower side in FIG. 30), the invention is not limited thereto, and the thin plate portion 1301 may be provided on the opposite side from the side of the slider 2 of the positioning portion 1300 (the upper side in FIG. 30).

In this configuration, the same effects as the embodiments described above are achieved and, in addition, the slider 2 and the positioning portion 1300 can be fixedly positioned only by arranging the back surface of the thin plate portion 1301 of the positioning portion 1300 so as to match the outline of the slider 2, in comparison with the case of configuring the positioning portion as the divided positioning portions 1100 (see FIG. 27) as in the twelfth embodiment. Accordingly, it is not necessary to perform the positioning or the like between the protruding portions 1302, the positioning between the positioning portion 1300 and the slider 2 can be achieved more easily, and the positioning or the fixation of the light waveguide 232 and the slider 2 are facilitated.

Fourteenth Embodiment

Figure 31:
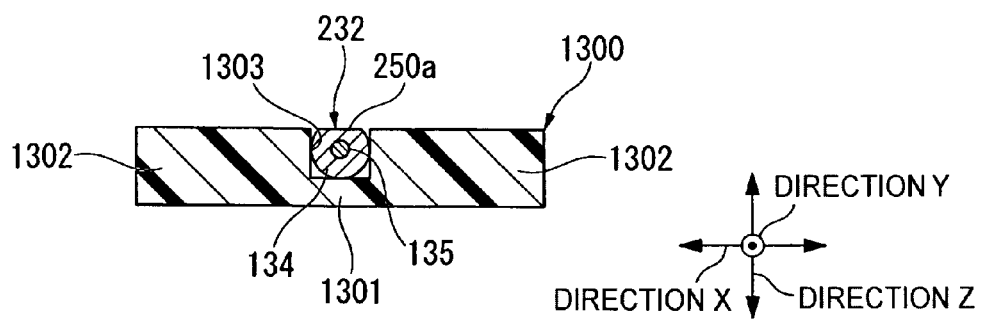
FIG. 31 is a cross-sectional view corresponding to the line H-H' in FIG. 14 showing a fourteenth embodiment of the present invention.

Subsequently, a fourteenth embodiment of the present invention will be described. FIG. 31 is a cross-sectional view corresponding to the line H-H' in FIG. 14 showing the fourteenth embodiment of the present invention. In the following description, similar configurations to those in the embodiments described above are designated by the same reference numerals, and description will be omitted. In the embodiments described above, the case where the flat surface 250*a* of the light waveguide 232 is arranged toward the slider 2 (see FIG. 14), that is, the case where the bottom surface of the guide groove 1303 and the flat surface 250*a* of the light waveguide 232 are in abutment with each other has been described.

In contrast, in this embodiment, as shown in FIG. 31, the flat surface 250*a* of the light waveguide 232 is accommodated in the guide groove 1303 in a state in which the flat surface 250*a* thereof is arranged so as to face toward the pad portion 17*b* (see FIG. 14). In this case, the flat surface 250*a* and the surface of the protruding portion 1302 (the side of the pad portion 17*b*) are arranged in flush with each other.

In this configuration, as in the third embodiment, the slider 2 and the positioning portion 1300 can be fixedly positioned only by arranging the back surface of the positioning portion 1300 (the back surface of the thin plate portion 1301) so as to match the outline of the slider 2.

In addition, since the flat surface 250a of the light waveguide 232 and the surface of the protruding portion 1302 are arranged in flush with each other, the positioning portion 1300 and the light waveguide 232 are brought into plane-to-plane abutment with the pad portion 17b. In other words, when fixing the positioning portion 1300 and the light waveguide 232 with the pad portion 17b, the flat surface 250a of the light waveguide 232 functions as the positioning portion for the positioning with respect to the pad portion 17b. Therefore, the light waveguide 232 can be fixed easily and reliably with respect to the flexible pad portion 17b.

Fifteenth Embodiment

Figure 32:
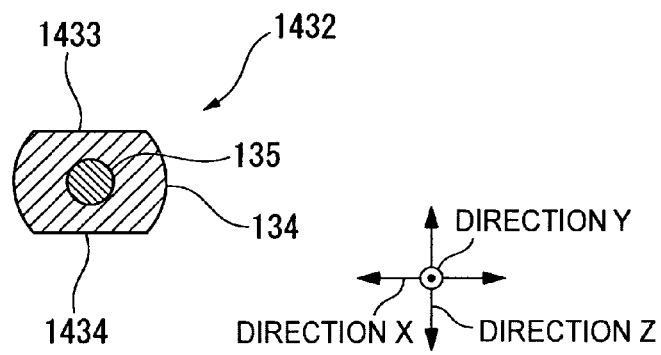
FIG. 32 is a cross-sectional view of a light waveguide according to a fifteenth embodiment of the present invention.
Figure 33:
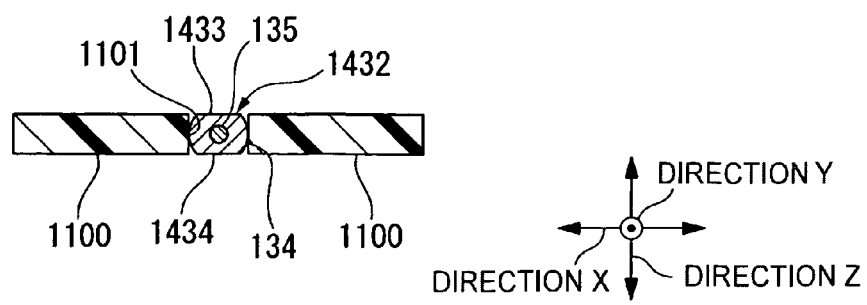
FIG. 33 is a cross-sectional view corresponding to the line H-H' in FIG. 14 showing the fifteenth embodiment of the present invention.

Subsequently, a fifteenth embodiment of the present invention will be described. FIG. 32 is a cross-sectional view of a light waveguide in the fifteenth embodiment, and FIG. 33 is a cross-sectional view taken along the line in H-H' in FIG. 14. In the following description, similar configurations to those in the embodiments described above are designated by the same reference numerals, and description will be omitted.

As shown in FIGS. 32 and 33, a light waveguide 1432 in this embodiment is formed with flat surfaces 1433, 1434 formed by grinding positions of the outer peripheral surface of the clad 134 opposing to each other in the peripheral direction (Y direction in FIG. 32). The light waveguide 1432 is stored in the guide groove 1101 so that the flat surfaces 1433, 1434 are flush with the front surface and the back surface of the positioning portion 1100, respectively.

In this configuration, by forming the flat surface 1434 on the outer peripheral surface of the clad 134, the interface between the mirror surface 92a and the spot light converter 40 becomes a flat surface as in the case of the fourth embodiment described above (see FIG. 14). Accordingly, the spot shape of the incident light to the slider 2 can be optimized by adjusting the output angle of the optical flux L, so that the spotlight can be generated efficiently by the spot size converter 40 (see FIG. 14).

Since the flat surfaces 1433, 1434 of the light waveguide 1432 and the both surfaces of the positioning portion 1100 are arranged in flush with each other, the flat surfaces 1433, 1434 of the light waveguide 1432 come into plane-to-plane abutment with the slider 2 (see FIG. 14) and the pad portion 17b, respectively. In other words, when fixing the positioning portion 1100 and the light waveguide 1432 are fixed to the slider 2, and then fixing the same to the pad portion 17b, the flat surface 1433 of the light waveguide 1432 functions as the positioning portion for the positioning with respect to the pad portion 17b. Therefore, the light waveguide 1433 can be fixed easily and reliably with respect to the flexible pad portion 17b.

The technical scope of the invention is not limited to the embodiments shown above, and includes various modifications without departing the scope of the invention. In other words, the configurations described in the above-described embodiments are examples only, and modifications may be made as needed. For example, combinations of the respective embodiments may be employed as needed.

Although the case where the data recording and reproducing apparatus of the air floating type in which the slider is floated is exemplified in the respective embodiments described above, the invention is not limited to this case, and the disk and the slider may be in contact with each other as long as it is arranged so as to oppose the disc surface. In other words, the slider in the present invention may be a slider of a contact slider type. In this case as well, the same effects and advantages may be achieved.

In the embodiments described above, the configuration in which the head gimbal assembly is provided only on one side of the arm portion has been described. However, a configuration in which the head gimbal assemblies are provided on both surfaces of the arm portion which is inserted between the disks so as to oppose the respective disks is also applicable. In this case, with the respective sliders of the head gimbal assemblies provided on both sides of the arm portion, data recording and reproduction with respect to the disk surfaces opposing the respective sliders are achieved. In other words, the data recording and reproduction for two disks are performed with one arm portion, so that increase in recording capacity of the data recording and reproducing apparatus and downsizing of the apparatus are achieved.

In addition, in the respective embodiments described above, the positioning portion in the present invention has been described as the plate portion (for example, the plate portion 50) formed in the equivalent shape as the outline of the upper surface (XY plane) of the slider 2. However, the invention is not limited thereto, and it may be larger or smaller than the plate portion. For example, the width of the plate portion and the width of the light waveguide may be formed into the substantially same widths. In other words, a plate portion having the substantially same width as the light waveguide may be provided on an extension line of the corresponding light waveguide. In this case as well, by forming the upper and lower surfaces of the plate portion (the surfaces bonded to the slider 2 and the pad portion 17b) into flat surfaces, positioning of the light waveguide with respect to the slider 2 is facilitated, and the efficiency of manufacturing may be improved.

By arranging the light waveguide extending to the spotlight generating element easily in the slider, the cost of working a process and the cost of manufacturing are reduced, so that the manufacturing efficiency is improved.

REFERENCE NUMERALS

D disc (recording medium)
D1 disc surface (surface of the recording medium)
1 data recording and reproducing apparatus
2 slider
3 suspension
10 pivot shaft
11 carriage
12 head gimbal assembly
14 arm portion
17 gimbal
17b pad portion (supporting portion)
20 laser light source (light source)
32, 132, 232, 332, 532, 632, 732, 832, 932, 1032, 1432 light waveguide
32a, 132a, 92a, 292a mirror surface
34 clad
35, 635, 735 core
50, 150, 250, 350, 550 plate portion
60, 160 slider substrate
40 spot size converter (spotlight generating element)
91 fiber (graded index fiber)
92 no-clad fiber
140 head waveguide (spotlight generating element)
250a flat surface
270 mirror substrate
501 connecting portion
801 tunnel portions
901, 1001 stress applying portions
1101, 1303 guide groove

The invention claimed is:

1. A head gimbal assembly comprising:
a suspension configured to extend along a surface of a recording medium and being flexibly deformable in a thickness direction of the recording medium;
a slider arranged on a distal side of the suspension so as to oppose the surface of the recording medium;
a supporting portion provided on the suspension and configured to support the slider in parallel to the surface of the recording medium and to undergo rotation about two axes orthogonal to each other; and
a light waveguide connected to the slider and configured to introduce an optical flux emitted from a light source to the slider, the light waveguide having a core and a clad configured to seal the core;
wherein the slider comprises a spotlight generating element configured to generate a spotlight from the optical flux that is used to record data in the recording medium; and
wherein a positioning portion for positioning the light waveguide and the slider is comprised of a plate portion provided at a distal end of the light waveguide and having the same outline as an upper surface of the slider, the positioning portion being arranged between the supporting portion and the slider so that the supporting portion supports the slider via the positioning portion.

2. A head gimbal assembly according to claim 1; wherein the core is configured to introduce the optical flux emitted from the light source under total reflection conditions, and the clad is formed of a material having an index of refraction lower than an index of refraction of the core and configured to come into tight contact with the core to seal the core; and wherein the positioning portion is formed integrally with the clad.

3. A head gimbal assembly according to claim 1; wherein the core is configured to introduce the optical flux emitted from the light source under total reflection conditions, and the clad is formed of a material having an index of refraction lower than an index of refraction of the core and configured to come into tight contact with the core to seal the core.

4. A head gimbal assembly according to claim 3; wherein at least part of a flat surface of the positioning portion is provided on the light waveguide and opposes at least one of the slider and the supporting portion.

5. A head gimbal assembly according to claim 3; wherein the positioning portion comprises a pair of positioning portions, and a guide groove configured to accommodate the light waveguide is formed between the pair of positioning portions; and wherein the light waveguide is introduced to the spotlight generating element in the guide groove.

6. A head gimbal assembly according to claim 2; wherein a lateral width and a vertical width of a cross section of the core taken orthogonally to the direction of extension of the core are different from each other.

7. A head gimbal assembly according to claim 2; further comprising a tunnel portion formed as a space in the clad and extending along the direction of extension of the core.

8. A head gimbal assembly according to claim 2; wherein the light waveguide has a stress applying portion for applying a compression stress in the direction orthogonal to the direction of extension of the core.

9. A head gimbal assembly according to claim 8; wherein the stress applying portion comprises a plurality of stress applying portions arranged so as to sandwich both sides of the core.

10. A head gimbal assembly according to claim 8; wherein the stress applying portion is arranged on the surface of the clad.

11. A head gimbal assembly according to claim 2; wherein the distal end surface of the light waveguide is a mirror surface configured to reflect the optical flux introduced into the light waveguide toward the spotlight generating element.

12. A head gimbal assembly according to claim 1; wherein a flat surface which is an outer peripheral surface of the clad exposed in a planer shape is formed on the side of a contact surface of the positioning portion with respect to the slider and between the mirror surface and the spotlight generating element.

13. A head gimbal assembly according to claim 1; wherein at least part of a side surface of the plate portion is flush with at least part of a side surface of the slider.

14. A head gimbal assembly according to claim 13; wherein the plate portion has a width larger than a width of the light waveguide.

15. A head gimbal assembly according to claim 1; further comprising a connecting portion configured to connect the plate portion and the light waveguide, the connecting portion decreasing in cross section from the plate portion toward the light waveguide.

16. A data recording and reproducing apparatus comprising:
a head gimbal assembly according to claim 1;
a magnetic recording medium configured to rotate in a constant direction;
a light source configured to emit an optical flux for heating the magnetic recording medium;
a pivot shaft arranged outside of the magnetic recording medium; and
a carriage mounted to undergo rotation around the pivot shaft and having an arm portion configured to support the head gimbal assembly.

17. A head gimbal assembly according to 3; wherein at least part of the light waveguide has a graded index fiber.

18. A head gimbal assembly according to 4; wherein at least part of the light waveguide has a graded index fiber.

19. A head gimbal assembly according to 5; wherein at least part of the light waveguide has a graded index fiber.

20. A head gimbal assembly according to claim 19; wherein at least part of the light waveguide propagates the optical flux using the entire part thereof.

21. A head gimbal assembly comprising:
a suspension configured to extend along a surface of a recording medium and to bend and deform in a thickness direction of the recording medium;
a slider provided on a front end side of the suspension so as to confront the surface of the recording medium;
a support section provided on the suspension for supporting the slider such that the slider can pivot about two axes parallel to the surface of the recording medium and perpendicular to each other;
an optical waveguide connected to the slider and configured to introduce a light flux into the slider, the optical waveguide having a core and a clad configured to seal the core;
a near-field light generating element for generating near-field light from the light flux and for causing the near-field light to record information on the recording medium; and
a positioning section for positioning the optical waveguide relative to the slider and being arranged between the support section and the slider so that the support section supports the slider via the positioning section, the positioning section comprising a plate portion provided at a distal end of the light waveguide and having the same outline as an upper surface of the slider.

22. A head gimbal assembly according to claim 1; wherein the positioning portion is disposed directly over the supporting portion.

* * * * *